(12) United States Patent
Kulik

(10) Patent No.: US 7,680,951 B1
(45) Date of Patent: Mar. 16, 2010

(54) HIGH SPEED SUBSCRIBE-AND-ALERT SERVICE USING CONTENT GRAPHS

(75) Inventor: Joanna L. Kulik, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1505 days.

(21) Appl. No.: 10/935,843

(22) Filed: Sep. 8, 2004

Related U.S. Application Data

(60) Provisional application No. 60/575,905, filed on Jun. 1, 2004.

(51) Int. Cl.
G06F 15/173 (2006.01)
G06F 17/00 (2006.01)

(52) U.S. Cl. ...................... 709/238; 707/100
(58) Field of Classification Search ............ 709/238; 707/100
See application file for complete search history.

(56) References Cited

U.S. PATENT DOCUMENTS

| | | | |
|---|---|---|---|
| 6,055,364 A | 4/2000 | Speakman et al. | |
| 6,275,957 B1 | 8/2001 | Novik et al. | |
| 6,298,455 B1 | 10/2001 | Knapman et al. | |
| 6,314,533 B1 | 11/2001 | Novik et al. | |
| 6,389,475 B1 | 5/2002 | Speakman et al. | |
| 6,556,983 B1 * | 4/2003 | Altschuler et al. | 706/55 |
| 6,728,715 B1 | 4/2004 | Astley et al. | |
| 2003/0144849 A1 | 7/2003 | Kakivaya et al. | |
| 2003/0169749 A1 | 9/2003 | Huang et al. | |
| 2003/0229674 A1 | 12/2003 | Cabrera et al. | |
| 2004/0001498 A1 | 1/2004 | Chen et al. | |
| 2004/0076155 A1 | 4/2004 | Yajnik et al. | |
| 2006/0291404 A1 * | 12/2006 | Thubert et al. | 370/254 |

OTHER PUBLICATIONS

Slide Presentation at Distributed Event-Based Systems—Jun. 8, 2003, by Joanna Kulik.
Fast and Flexible Forwarding for Internet Subscription Systems, Distributed Event-Based Systems—Jun. 8, 2003 by Joanna Kulik.
Exploiting IP Multicast in Content-Based Publish-Subscribe Systems, Middleware 2000 Proceedings—Apr. 2000, by Lukasz Opyrchal, Mark Astley, Joshua Auerbach, Guruduth Banavar, Robert Strom and Daniel Sturman.
An Efficient Multicast Protocol for Content-Based Publish-Subscribe Systems, Proceedings of the International Conference on Distributed Computing Systems (ICDS), Austin—May 1999, by Guruduth Banavar, Tushar Chandra, Bodhi Mukherjee, Jay Nagarajarao, Robert E. Strom and Daniel C. Sturman.

(Continued)

Primary Examiner—George C Neurauter, Jr.
(74) Attorney, Agent, or Firm—Muirhead and Saturnelli, LLC

(57) ABSTRACT

Described are techniques used in connection with subscribe and alert services as may be embodied in a subscription system. The subscription system uses a preprocessor for preprocessing subscription and notification messages prior to submission to the subscription/publication server. The preprocessor outputs a preprocessed message including one or more identifiers categorizing an input subscription or notification message. The preprocessor uses a content graph to produce the preprocessed message. The subscription system uses a content based routing system with a tree-like topology to process preprocessed subscriptions and notifications using content graphs maintained at each node in the system. Also described is a loss detection technique using sequence numbers.

34 Claims, 40 Drawing Sheets

OTHER PUBLICATIONS

Matching Events in a Content-based Subscription System, Principles of Distributed Computing 1999 by Marcos K. Aguilera, Robert E. Strom, Daniel C. Sturman, Mark Astley and Tushar D. Chandra.

Herald: Achieving a Global Event Notification Service, May 2001 by Luis Felipe Cabrera, Michael B. Jones and Marvin Theimer.

Forwarding in a Content-Based Network, SIGCOMM '03, Aug. 25-29, 2003 by Antonio Carzaniga and Alexander L. Wolf.

Design and Evaluation of a Wide-Area Event Notification Service, ACM Transactions on Computer Systems, vol. 19, No. 3, Aug. 2001, pp. 332-383 by Antonio Carzaniga, David S. Rosenblum and Alexander L. Wolf.

Publish/Subscribe on the Web at Extreme Speed, Proceedings of the 26th VLDB Conference, Cairo, Egypt—2000 by Joao Pereira, Francoise Fabret, Francois Llirbat, Radu Preotiuc-Pietro, Kenneth A. Ross and Dennis Shasha.

Mesh-Based Content Routing using XML, 18th ACM Symposium on Operating System Principles (SOSP '01) by Alex C. Snoeren, Kenneth Conley and David K. Gifford.

The Architecture of the Ready Event Notification Service, 1999 AT&T Software Symposium by R.E. Gruber, B. Krishnamurthy and E. Panagos.

Achieving Scalability and Expressiveness in an Internet-Scale Event Notification Service, PODC 2000 Portland, Oregon by Antonio Carzaniga, David S. Rosenblum and Alexander L. Wolf.

* cited by examiner

A partial-ordering of baseball subscriptions expressed as attribute-value pairs.

350 ─┐

360 ⎰ AddSubscription( subscription $s$, neighbor $i$)
    ⎨     Let $v$ be the node indicated in the header of $s$
    ⎨     Let $t$ be the namespace indicated in the header of $s$
    ⎨     If $v$ is not yet in $G_t$, get graph information for $v$ and insert $v$ into graph $G$ ─── 362
    ⎨     Add $i$ to subscription list, $i_v$, for $v$ ─── 363a
    ⎨     If $v$ had no previous subscribers,
    ⎩             Forward $s$ toward the rendezvous point for namespace $t$ ─── 363b 370 ⎰ ForwardNotification (notification $n$)
    ⎨     Let $V$ be the set of nodes indicated in the header of $n$
    ⎨     Let $t$ be the namespace indicated in the header of $n$
    ⎨     Let $I$ be an initially empty set of neighbors
    ⎨     Let $H$ be an initially empty set of notification headers
    ⎨     Find the set of ancestor nodes $A_v$ for nodes $V$ in graph $G_t$ ─── 372
    ⎨     ⎰ Foreach node $a$ in $A_v + V$, perform a bottom-up, breadth-first graph-traversal
    ⎨ 373 ⎨     Add the subscriber list for $a$, $i_a$, to $I$
    ⎨     ⎨     Foreach neighbor $i$ indicated in subscriber list for $a$, $i_a$
    ⎨     ⎨         Let $h_i$ be the header for the neighbor $i$ in $H$
    ⎨     ⎩         If $a$ has no descendants in $h_i$, add $a$ to the header $h_i$
    ⎨     Foreach neighbor $i$ in $I$
    ⎩             Forward a copy of $n$ to neighbor $i$, replacing the header with $h_i$ ─── 374

The forwarding algorithm for routers that minimize graphs.

FIG. 8

An example of a system that minimizes content graphs.

800

820 {
AddSubscription( subscription $s$, neighbor $i$)
  Let $v$ be the node indicated in the header of $s$
  Let $t$ be the namespace indicated in the header of $s$
  If $v$ is not yet in $G_t$, get graph information for $v$ and insert $v$ into graph $G_t$ ——822a
  If $i$ is not on the subscription list for $v$, $i_v$, add $i$ ——822b
  AdjustDescendantLabelsIfNecessary( $v, i, t$)
  If $v$ had no previous subscribers
    Forward $s$ toward the rendezvous point for namespace $t$ 840 {
AdjustDescendantLabelsIfNecessary( node $v$, neighbor $i$, namespace $t$)
  Let $o_{v,i}$ be the output labels for node $v$, neighbor $i$ ——842a
  Let $D_v$ be the set of all descendants for node $v$ in graph $Gt$ ——842b
  844 {
    Foreach node $d$ in $D_v$
      Let $o_{d,i}$ be the output labels for descendant $d$, neighbor $i$
      If node of the nodes in $o_{d,i}$ is in the set of $v$'s descendants, $D_v$
        Subtract $o_{v,i}$ from $o_{d,i}$ ——844b
        Add $v$ to $o_{d,i}$ ——844a
  Set $o_{v,i}$ to contain the node $v$ ——846

860 {
ForwardNotification (notification $n$)
  Let $V$ be the set of nodes indicated in the header of $n$
  Let $t$ be the namespace indicated in the header of $n$
  Let $I$ be an initially empty set of neighbors
  Let $H$ be an initially empty set of notification headers
  862 {
    Foreach node $v$ in $V$
      Add the subscriber list for $v$, $i_v$, to $I$
      Foreach neighbor $i$ indicated in subscriber list for $v$, $i_v$
        Let $h_i$ be the header for the neighbor $i$
        Let $o_{v,i}$ be the set of output labels for node $v$ and neighbor $i$
        Add $o_{v,i}$ to $h_i$ ——864
  866 {
    Foreach neighbor $i$ in $I$
      Forward a copy of $n$ to neighbor $i$, replacing the header with $h_i$

FIG. 10D

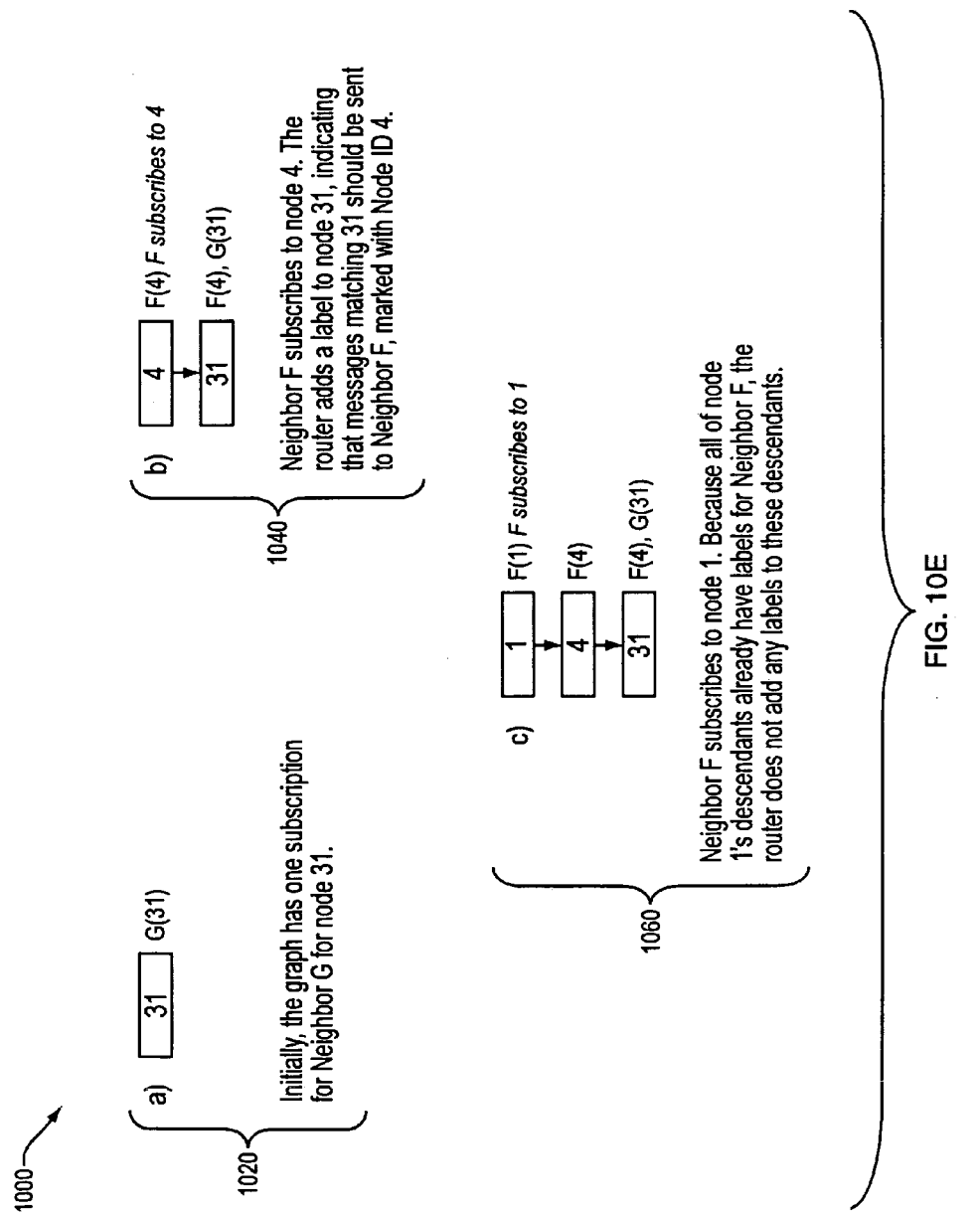

*How a graph's output labels change as subscriptions are added.*

An example of F3 forwarding.

600

620 {
AddSubscription( subscription *s*, neighbor *i*)
    Let $v$ be the node indicated in the header of $s$
    Let $t$ be the namespace indicated in the header of $s$
    If $v$ is not yet in graph $G_t$ 621 {
        Add $v$ to list of nodes that is pending graph information
        Add a subscription for $i$ to node $v$
        If the subscription is marked "graph-request"
            Make a note that $i$ is "graph-request-pending" on $v$
        Send a subscription for $v$ upstream, marked "graph-request"

622
    else
        If the subscription is marked "graph-request", SendGraphSetup( $v, i, t$ )
    *Continue with subscription algorithm as before...*

640 {
SendGraphSetup( node $v$, neighbor $i$, namespace $t$ )
    Let $P$ be the empty set of parent nodes for $v$
    Let $A_v$ be the set of all ancestors for node $v$ in graph $G_t$
    Foreach node $a$ in $A_v$
        Add $a$ to $P$ if $i$ is subscribed to $a$ and $a$ has no descendants in "$A$"$_v$
    Let $C$ be the empty set of child nodes for $v$
    Let $D_v$ be the set of all descendants for node $v$ in graph $G_t$
    Foreach node $d$ in $D_v$
        Add $d$ to $C$ if $i$ is subscribed to $c$ and $c$ has no ancestors in $D_v$
    Send a Graph-setup message downstream, containing $v, t, P$, and $C$ 660 {
ReceiveGraphSetup( node $v$, namespace $t$, parents $P$, children $C$ )
    Find $v$ in the list of nodes pending graph information
    Add $v$ to graph $G_t$
    Add $P$ to the parent list for $v$
    Add $C$ to the child list for $c$
    For all neighbors $i$ subscribed to $v$
        AddSubscription( $v, i$ )
        If $i$ is marked "graph-request-pending" on $v$
            SendGraphSetup( $v, i, t$ )
    Remove all marks from $v$ The algorithm that F3 routers use to set up graphs.

FIG. 11

An example of resubscription in F3.

The resubscription algorithm.

```
PeriodicCheckGraph( namespace t)
    Foreach node v in graph G_t
        If the resubscription acknowledgement timestamp has expired,
            mark the upstream subscription to v as interrupted.
        Foreach neighbor i in the subscription list i_v for v
            If the resubscription timestamp for i has expired,
                mark the downstream subscription to v from i as interrupted.
```

FIG. 16

The algorithm that routers use to check subscriptions periodically.

The unsubscription algorithm.

An example of unsubscription in F3.

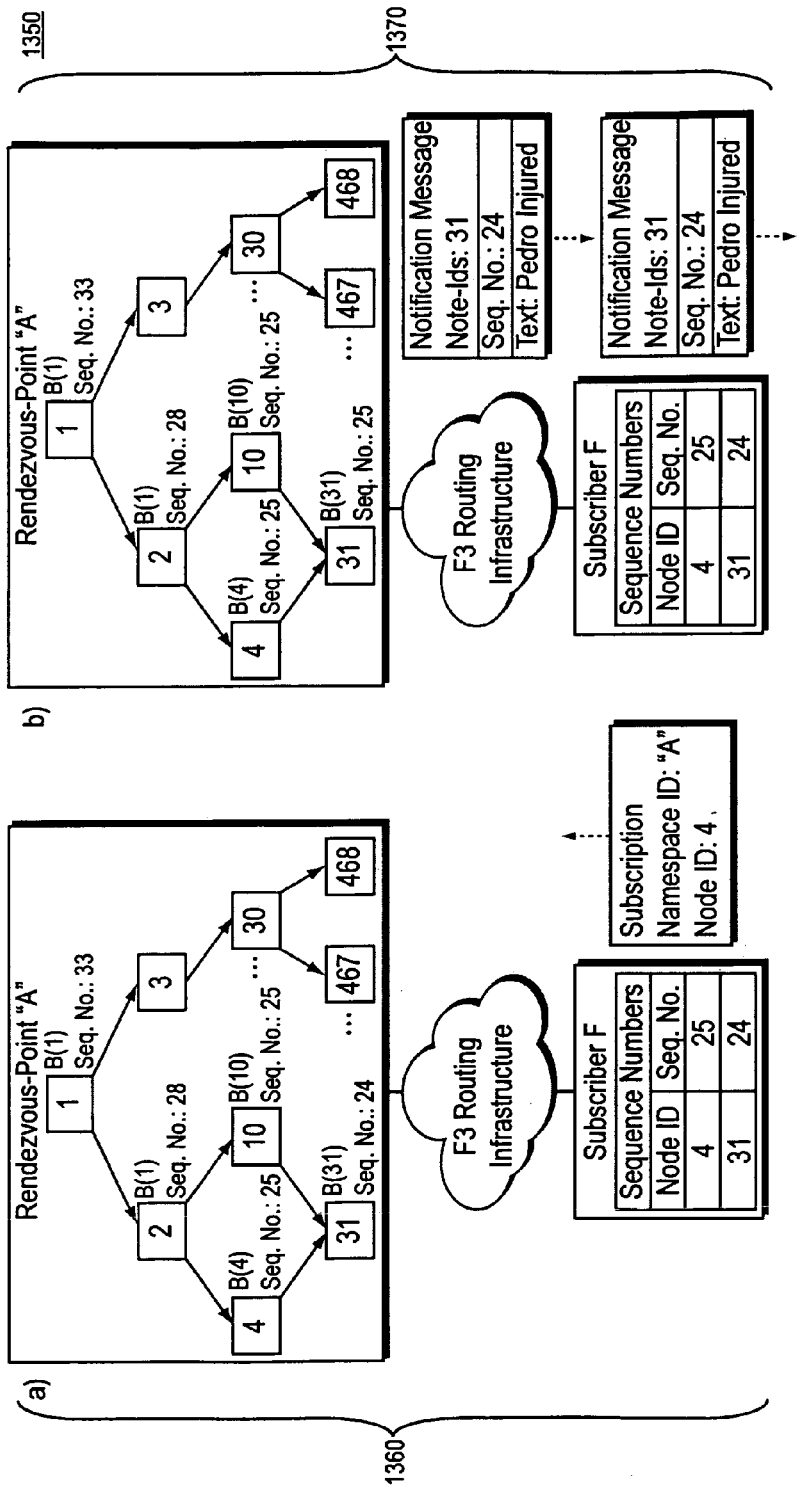

FIG. 20

An approach to loss-detection in F3. The subscriber first submits a subscription to F3, and F3 sets up the subscription as before (a). When the rendezvous point receives a notification message, it adds a header to the message, indicating the sequence numbers of the node IDs in the message header (b). It also increments the sequence numbers of the node IDs in its table. F3 then delivers the message to the appropriate subscribers as before. Subscribers detect losses by noting gaps in the sequence numbers they receive.

US 7,680,951 B1

HIGH SPEED SUBSCRIBE-AND-ALERT SERVICE USING CONTENT GRAPHS

RELATED APPLICATIONS

This application claims priority to U.S. Provisional Patent Application No. 60/575,905, filed on Jun. 1, 2004, which is incorporated by reference herein.

STATEMENT OF GOVERNMENT INTEREST

The invention was made with Government support under contract No. F30602-00-2-0553 by the Department of the Air Force. The Government has certain rights in the invention.

BACKGROUND

1. Technical Field

This application generally relates to event notification, and more particularly to event notification as may be used in connection with a subscription service.

2. Description of Related Art

Computer systems may be used in performing a variety of different tasks and operations. One or more computer systems may be connected using a network such as the Internet. The Internet may be used to find information of interest about a selected topic. Search engines, such as Google, may be used to return information in accordance with a search query. However, such queries provide a snapshot of information in response to a query at a particular point in time and do not alert users when subsequent new information may be available.

Subscription systems or event notification systems may be used to notify or report information to a subscriber from an information provider when certain events occur. Such systems in use today include, for example, subscription to weather service notifications, stock market prices, and the like. Users or subscribers sign up to receive information of interest. When an event of interest occurs, the subscribers may be sent an electronic notification.

One type of existing subscription service is a unicast subscription system such as, for example, Ebay, Amazon, and Google. Notifications are sent to users about selected topics of interest or items as selected by the users or subscribers. In the unicast approach, subscribers send messages to a single information provider. However, existing unicast subscription services may be unable to efficiently distribute notifications to a large number of subscribers. Thus, when there are a large number of notification messages to be sent, the subscription service may experience an unacceptable performance degradation.

Another existing approach, the single-identifier multicast subscription system, is based on the IP multicast communication model. Using multicast, a subscriber sends her subscription to a provider. When the provider is ready to broadcast an event or send out a notification, the provider addresses each packet to a single IP multicast address or channel. Upon receiving a packet, the router looks up the identifier and forwards the packet to selected neighboring routers or subscribers according to its router notification tables. The multicast subscription service uses a topology of one or more event routers to disseminate notifications. The event routers may be arranged, for example, in an overlay network. An identifier may be associated with a particular subject or category of information about which a subscriber may receive information. A difficulty may occur if a subscriber chooses to request information from overlapping subscription categories each represented by an identifier. As an example of the foregoing, a subscriber may want to receive notification for all baseball games between the Boston Red Sox and any New York baseball team. Rather than use 3 subscription category identifiers (one each for "baseball", "Red Sox" and "New York"), a subscription service may have to use, for example, 7 group identifiers to represent the possible subscription category intersections and avoid sending out messages or notifications to the subscriber that do not fit the selected subscription criteria. The number of category identifiers increases with the number of subscription categories and associated category subscription intersections.

Another approach based on the IP multicast model may be referred to as a content-based multicast system. In the content-based system, the forwarded messages are based on message text rather than relying on a single-identifier attached to each message. Existing content-based systems may use subscription requests and notifications based on attribute-value pairs (e.g., TYPE=BASEBALL, GAME=CUBS v. MARLINS, DATE=OCTOBER 20). Such systems may impose a structure on the message and may require modifications to many components (such as each of the routers) of the system to support multiple message formats or changes to an existing format. In comparison to the identifier multicast-based system for example, additional computation time may be used to parse the strings of the message text decreasing the efficiency of the content-based multicast approach.

Thus, it may be desirable to have an efficient and flexible system for use in event notification applications that overcomes one or more of the problems with the existing techniques. It may be desirable to have a single system for event notification in connection with multiple information providers in which the system may be easily adjusted to accommodate varying subscriber and notification formats.

SUMMARY OF THE INVENTION

In accordance with one aspect of the invention is a method for processing messages in a subscription system comprising: preprocessing a message using a content graph to produce a preprocessed message including an identifier in accordance with said message; and submitting said preprocessed message to a server for processing wherein said server performs at least one action in accordance with said identifier included in said preprocessed message. The message may be a subscription message and said preprocessed message may include an identifier matching said subscription message. The server may include a plurality of routers in a hierarchical arrangement, and the method may further comprise: receiving said preprocessed message at a router; storing at said router information in a content graph of said router information about a subscription in accordance with said preprocessed message; and forwarding said preprocessed message to one or more upstream routers at a higher level in said hierarchical arrangement than said router in accordance with a forwarding table of said router. The method may also include adding a node to said content graph of said router if there are no nodes in said content graph corresponding to said subscription. The router may communicate with another upstream router to obtain graph information about where to add said node to said content graph. The router may communicate with said preprocessor to obtain graph information about where to add said node to said content graph. Each router in said hierarchical arrangement may include a content graph of said each router including information about preprocessed subscription messages received from a subscriber and other routers connected to said each router in said hierarchical arrangement. A preprocessor may add a node to a preprocessor content graph of said preprocessor each time a received message does not have a corresponding node in said preprocessor content graph. Information about said node may be obtained from preconstructed tables including graph information about a categorical hierarchy. The message may be a notification message and said preprocessed message may include at least one identifier matching said notification message. The preprocessed message may include a set of one or more nodes in said content graph representing lowest nodes in said content graph that cover said notification message, said content graph being a hierarchy of nodes representing relationships between different sets of elements, wherein each node in said set matches said notification message and no node in said set is an ancestor of any other node in said set. The preprocessed message may include a set of one or more nodes in said content graph representing all nodes in said content graph that cover said notification message, said content graph being a hierarchy of nodes representing relationships between different sets of elements. The server may include a plurality of routers in a hierarchical arrangement, and the method may further comprise: receiving at a first router that is a root of said hierarchical arrangement said preprocessed message; and forwarding said preprocessed message to any downstream neighbors of said first router at a lower level in said hierarchical arrangement than said root in accordance with a content graph of said first router. The neighbors of said first router may include other routers and subscribers, said other routers being connected to said first router in accordance with a subscription list of said content graph of said first router. The method may also include modifying a header of a notification message forwarded in said forwarding in which said identifier is replaced with another identifier determined in accordance with a neighbor receiving said notification message. The other identifier may be predetermined prior to receiving said preprocessed message by said root. The preprocessed message may include a sequence number uniquely corresponding to the notification message, said notification message being associated with a node in a categorical hierarchy wherein said node in said categorical hierarchy has a sequence number determined in accordance with a number of notification messages received by said server covering said node, each node in said categorical hierarchy having its own sequence number. The method may also include receiving by said first router a request from a subscriber for a table of current sequence numbers for a requested node and descendants of said requested node in said content graph of said first router; and sending to said subscriber said table, wherein said subscriber uses said table to determine a missed notification message in accordance with consecutive sequence numbers for each node described by said table. In response to receiving a notification message, said first router may increment a sequence number of each of one or more nodes in said content graph corresponding to said notification message.

In accordance with another aspect of the invention is a computer program product for processing messages in a subscription system comprising code that: preprocesses a message using a content graph to produce a preprocessed message including an identifier in accordance with said message; and submits said preprocessed message to a server for processing wherein said server performs at least one action in accordance with said identifier included in said preprocessed message. The message may be a subscription message and said preprocessed message includes an identifier matching said subscription message. The server may include a plurality of routers in a hierarchical arrangement, and the computer program product may further comprise code that: receives said preprocessed message at a router; stores, at said router, information in a content graph of said router information about a subscription in accordance with said preprocessed message; and forwards said preprocessed message to one or more upstream routers at a higher level in said hierarchical arrangement than said router in accordance with a forwarding table of said router. The computer program product may include code that adds a node to said content graph of said router if there are no nodes in said content graph corresponding to said subscription. The router may communicate with another upstream router to obtain graph information about where to add said node to said content graph. The router may communicate with said preprocessor to obtain graph information about where to add said node to said content graph. Each router in said hierarchical arrangement may include a content graph of said each router including information about preprocessed subscription messages received from a preprocessor may add a node to a preprocessor content graph of said preprocessor each time a received message does not have a corresponding node in said preprocessor content graph. Information about said node may be obtained from preconstructed tables including graph information about a categorical hierarchy. The message may be a notification message and said preprocessed message may include at least one identifier matching said notification message. The preprocessed message may include a set of one or more nodes in said content graph representing lowest nodes in said content graph that cover said notification message, said content graph being a hierarchy of nodes representing relationships between different sets of elements, wherein each node in said set matches said notification message and no node in said set is an ancestor of any other node in said set. The preprocessed message may include a set of one or more nodes in said content graph representing all nodes in said content graph that cover said notification message, said content graph being a hierarchy of nodes representing relationships between different sets of elements. The server may include a plurality of routers in a hierarchical arrangement, and the computer program product may further comprise code that: receives at a first router that is a root of said hierarchical arrangement said preprocessed message; and forwards said preprocessed message to any downstream neighbors of said first router at a lower level in said hierarchical arrangement than said root in accordance with a content graph of said first router. The neighbors of said first router may include other routers and subscribers, said other routers being connected to said first router in accordance with a subscription list of said content graph of said first router. The computer program product may also include code that: modifies a header of a notification message forwarded in said forwarding in which said identifier is replaced with another identifier determined in accordance with a neighbor receiving said notification message. The other identifier may be predetermined prior to said preprocessed message being received by said root. The preprocessed message may include a sequence number uniquely corresponding to the notification message, said notification message being associated with a node in a categorical hierarchy wherein said node in said categorical hierarchy has a sequence number determined in accordance with a number of notification messages received by said server covering said node, each node in said categorical hierarchy having its own sequence number. The computer program product may include code that: receives by said first router a request from a subscriber for a table of current sequence numbers for a requested node and descendants of said requested node in said content graph of said first router; and sends to said subscriber said table, wherein said subscriber uses said table to determine a missed notification message in accordance with consecutive sequence numbers for each node described by said table. In response to receiving a notification message, said first router may increment a sequence number of each of one or more nodes in said content graph corresponding to said notification message.

BRIEF DESCRIPTION OF THE DRAWINGS

Features and advantages of the present invention will become more apparent from the following detailed description of exemplary embodiments thereof taken in conjunction with the accompanying drawings in which:

FIG. 8 is an example representation of pseudocode describing processing steps in one embodiment for preprocessing subscription and notification messages;

FIG. 10D is a representation of processing steps for using output labels;

FIGS. 10E-10L are example illustrations of FIG. 10D processing using output labels;

FIG. 11 is an example representation of pseudocode for disseminating graph information in an embodiment using reduced or minimal content graphs;

FIG. 16 is an example representation of pseudocode for subscription checking in an embodiment of a router;

FIGS. 19 and 20 are example illustrations of a loss detection technique;

DETAILED DESCRIPTION OF EMBODIMENT(S)

Figure 1:
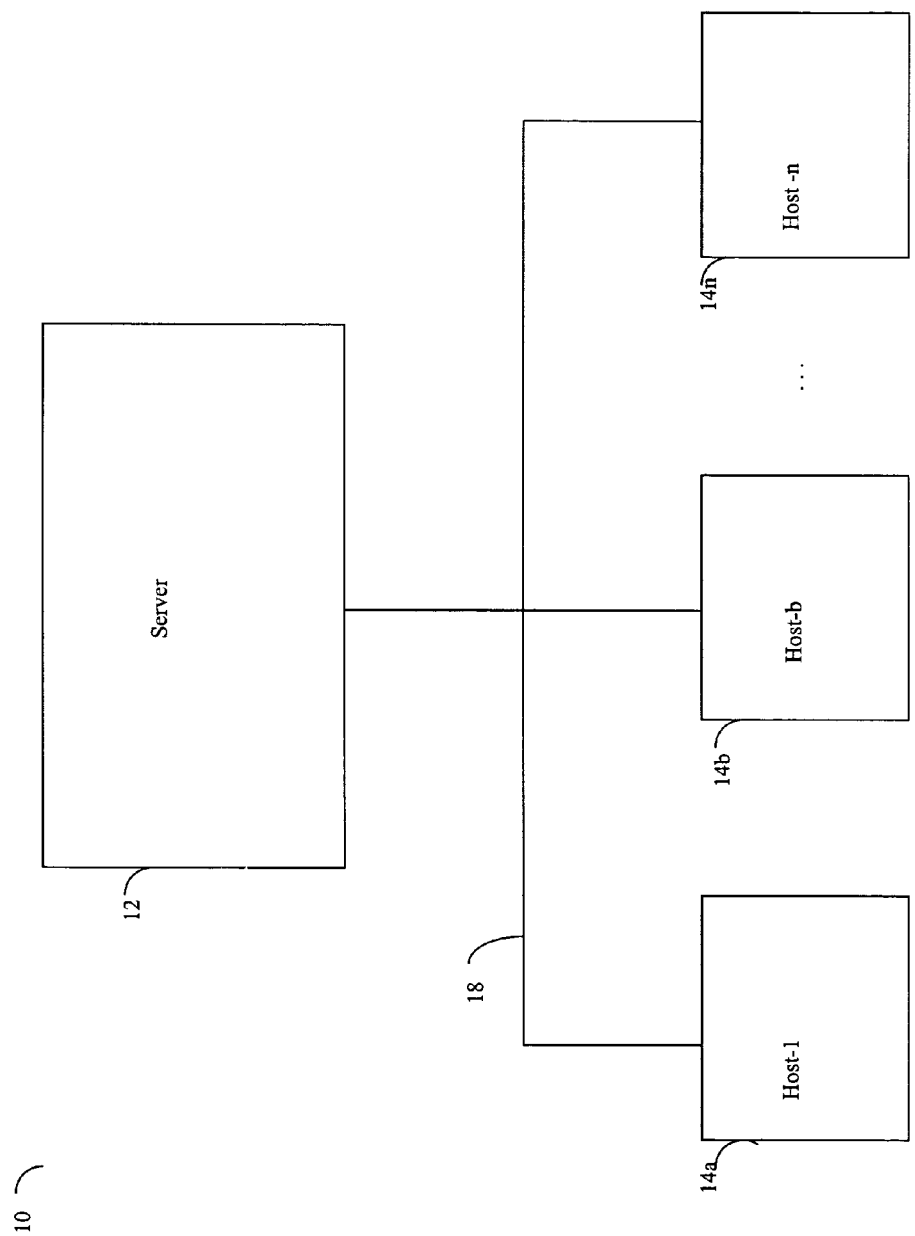
FIG. 1 is an example of an embodiment of a computer system according to the present invention.

Referring now to FIG. 1, shown is an example of an embodiment of a computer system according to the present invention. The computer system 10 includes a server system 12 connected to host systems 14a-14n through communication medium 18. In this embodiment of the computer system 10, the N hosts 14a-14n may communicate with the server system 12, for example, to send and receive information. In an embodiment that is described in following paragraphs, the server system 12 may include a subscription/publication system that communicates with one or more of the hosts 14a-14n. The communication medium 18 may be any one of a variety of networks or other type of communication connections as known to those of ordinary skill in the art. The communication medium 18 may be a network connection, bus, and/or other type of data link, such as a hardwire, wireless, or other connection known in the art. For example, the communication medium 18 may be the Internet, an intranet, or other non-network connection(s) by which the host systems 14a-14n may access and communicate with the server system 12, and may also communicate with other host systems included in the computer system 10.

Each of the host systems 14a-14n and the server system 12 included in the computer system 10 may be connected to the communication medium 18 by any one of a variety of connections as may be provided and supported in accordance with the type of communication medium 18.

It should be noted that the particulars of the hardware and software included in each of the host systems 14a-14n, as well as those components that may be included in the server system 12, are described herein in more detail, and may vary with each particular embodiment. Each of the host computers 14a-14n may all be located at the same physical site, or, alternatively, may also be located in different physical locations. Examples of the communication medium that may be used to provide the different types of connections between the host computer systems and the server system of the computer system 10 may use a variety of different communication protocols such as SCSI, Fibre Channel, or GIGE (Gigabit Ethernet), and the like. Some or all of the connections by which the hosts and server system 12 may be connected to the communication medium 18 may pass through other communication devices, such as switching equipment including, without limitation, a phone line, a repeater, a multiplexer or even a satellite.

What will now be described is an embodiment in which the server system 12 may include a subscription server and other components of a publication/subscription system. As used herein, the subscription/publication system may also be referenced as a subscription system. A user or client, such as on one of the host systems 14a-14n, may subscribe to the subscription server to receive electronic notifications for any one or more different types of events. For example, a user may subscribe to receive weather notification or alert information, stock information, sports information, and the like. The user enters notification or event criteria, such as identifying events of interest. Upon the occurrence of events that meet the user criteria, the subscription server sends the user a notification message.

Figure 2:
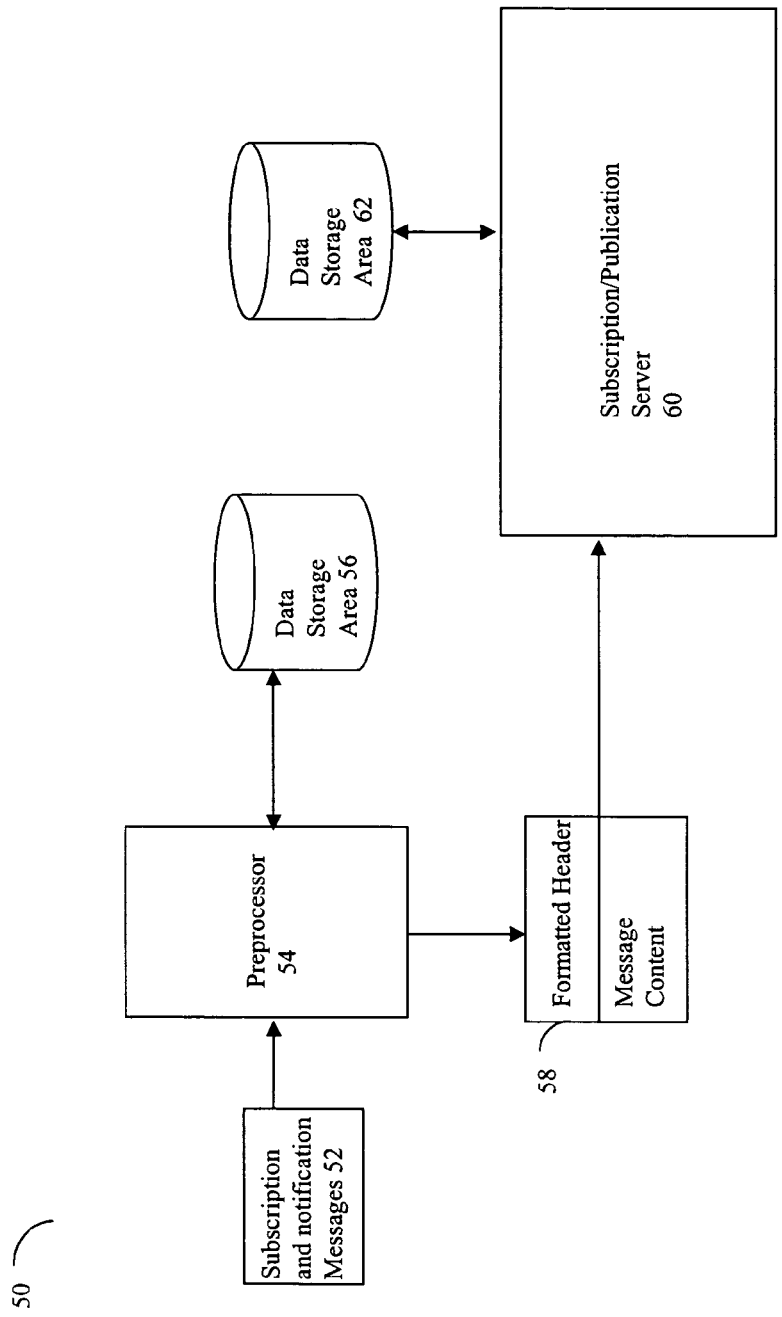
FIG. 2 is an example of components that may be used with the system of FIG. 1.

Referring now to FIG. 2, shown is a data flow diagram of different components that may be used within the computer system 10 of FIG. 1. The illustration 50 includes subscription and notification messages 52, a preprocessor 54, data storage areas 56 and 62, a preprocessed message 58, and a subscription/publication system or subscription server 60. In connection with an example embodiment that is described in more detail in following paragraphs, subscription and notification messages 52 may be submitted as input to the preprocessor 54. The preprocessor 54 produces as an output a preprocessed message 58 having a formatted header and associated message content. The preprocessed message 58 may then be submitted to the subscription server 60. The preprocessor 54 may use and store information from data storage area 56. The data storage areas 56 and 62 utilized, respectively, by the preprocessor 54 and subscription server 60 may be any one or more different types of storage areas and devices well-known to those of ordinary skill in the art such as, for example, memory or a disk included in a computer system upon which the preprocessor and/or subscription server reside.

In this embodiment, the preprocessor 54 may recognize and process any one or more different types and formats of subscription and notification messages 52. Additionally, an embodiment may have more than one preprocessor in accordance with the number and types of message formats in each embodiment. For example, a different preprocessor 54 may be used in connection with performing preprocessing on each unique subscription and notification message format. Each of the preprocessors that may be used in an embodiment in connection with multiple formats may produce preprocessed messages of a same uniform format used as input for the subscription server 60. In one embodiment, subscription and notification messages may be in any one of a variety of different formats including, for example, attribute-value pairs.

As will be appreciated by those of ordinary skill in the art, each preprocessor included in an embodiment may use any one of a variety of different parsing techniques to parse the messages 52. As will be described in more detail in following paragraphs, the formatted header of a preprocessed message may include formatted forwarding information to serve as the basis for forwarding messages within the subscription server 60.

With reference to FIG. 2, the subscription system executing and residing on a server system 12 in one embodiment may include one or more preprocessors 54, the subscription server 60 using the associated data storage areas 56 and 62.

A content graph may be used in an embodiment described herein to show how topics or subscription categories relate to one another in a subscription system. A content graph may be characterized as a directed acyclic graph or digraph representing a partial ordering between subscriptions. Each node in a graph represents a set of items. Each edge in the graph represents the relationship between two of these sets. Such content graphs are used in the embodiment described herein by the subscription server 60. The preprocessor 54 classifies the different subscription and notification messages 52 prior to being submitted to the subscription server 60 in accordance with a unique identifier associated with each node in the content graph. By using a preprocessor, the subscription and notification messages may be mapped to particular identifiers representing the different nodes in the content graph in a uniform fashion. The preprocessed messages may have a same uniform format for submission to the subscription server.

The unique identifier determined by the preprocessor may be included in the formatted header of the preprocessed message 58, and may be used in forwarding or routing messages within the subscription server 60. It should be noted that an embodiment may provide for preprocessing messages immediately before submitting them to the subscription server 60 as well as preprocessing messages for a time period prior to actual submission to the subscription server 60. The attribute-value pairs as will be used in following paragraphs are for the purposes of illustration of the techniques herein and should not be construed as a limitation of the different types of inputs and formats that may be included in an embodiment.

Use of the preprocessor as described herein removes some of the complexity from the subscription server and embodies it in the preprocessor 54. The one or more preprocessors 54 that may be included in an embodiment handle the different types of message formats that may used in a system 10 of FIG. 1.

Figure 2A:
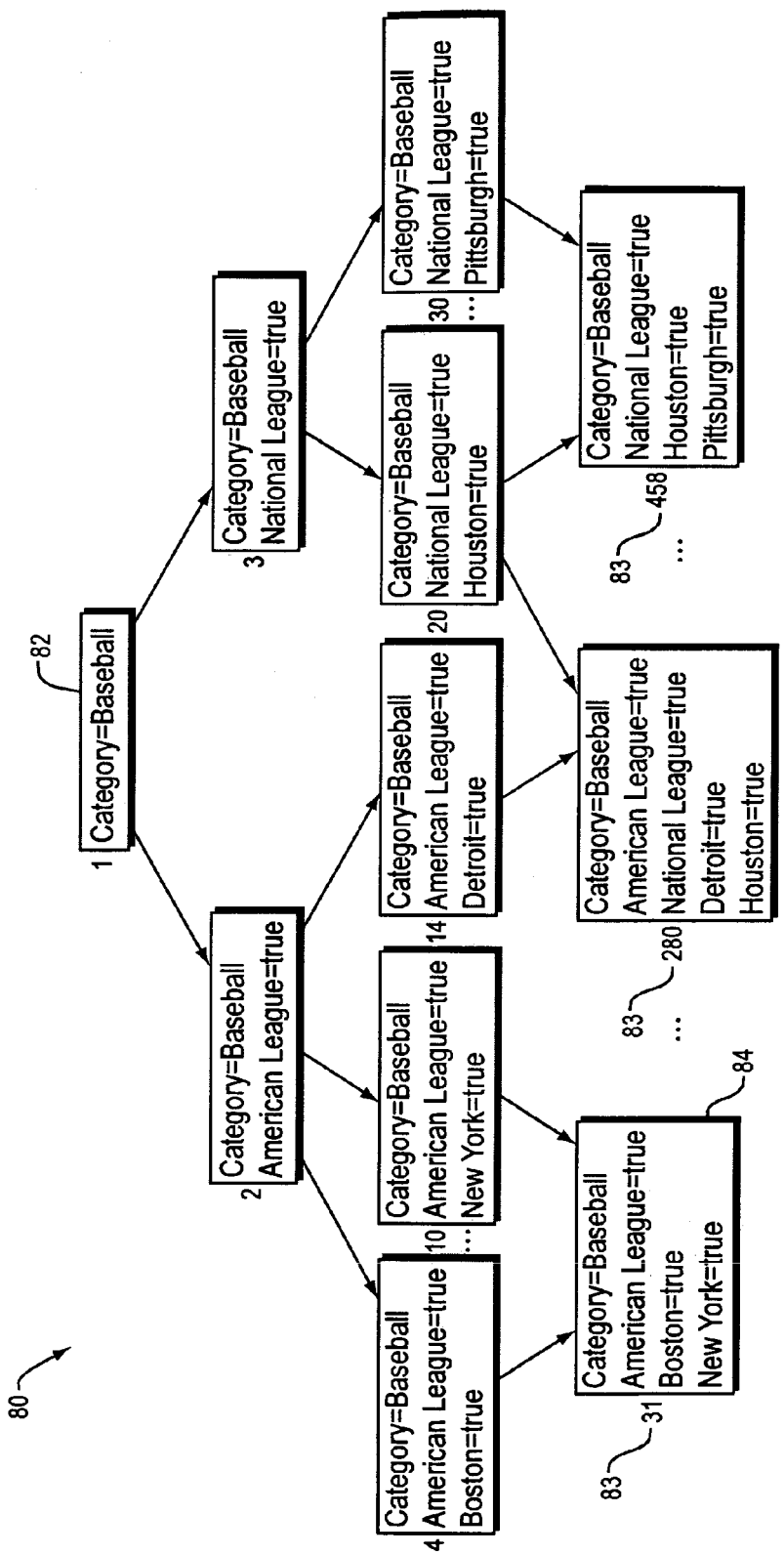
FIG. 2A is an example representation of a partial ordering of baseball subscriptions expressed as attribute-value pairs.

Referring now to FIG. 2A, shown is an example 80 of a representation of a partial ordering of baseball subscriptions that may be expressed as attribute-value pairs. The representation 80 is an example of one type of hierarchy in connection with representing the relationships between topics or categories used in a subscription system.

The example 80 is an attribute-value pair representation that may be expressed, for example, in XML format when submitting subscription and notification messages. Other types of hierarchical arrangements that may be used in connection with representing categorical relationships may include, for example, keyword hierarchies, object oriented hierarchies, and the like.

Referring to element 80, nodes closer to the top of the structure, such as node 82 with "Category=Baseball", represent more general topics or categories. The further towards the bottom of the structure a node is located, the more specific the category. An arrow that points from a first node of a first subscription topic to a second node of a second subscription topic indicates that the first subscription topic covers a superset of notifications of the second. In other words, a parent node in the representation 80 may be thought of as a superset of its child node or nodes. If there is a path in the graph of 80 between any two nodes from node A to B, then node A is a superset of the node B and any intervening nodes in the path to B.

The representation 80 of FIG. 2A may be stored and used by the preprocessor 54 in connection with classifying a subscription or notification message 52. As an output, the preprocessor 54 may include in the formatted header of 58 (from FIG. 2) a numerical value or other unique node identifier associated with the node in the representation 80 corresponding to particular topics included in a subscription or notification message 52. In FIG. 2A, the unique node identifier corresponding to each node, as may be determined by the preprocessor, is denoted, for example, as element 83 located to the left of each node in 80. Each node identifier is unique with respect to all other node identifiers in the representation 80.

An embodiment may include multiple hierarchical representations and node identifiers are unique with respect to each representation. A representation may exist for each set of related subscription categories. For example, a first representation may be used by a preprocessor for baseball subscriptions, a second different representation may be used in connection with music subscriptions, and the like.

Figure 2B:
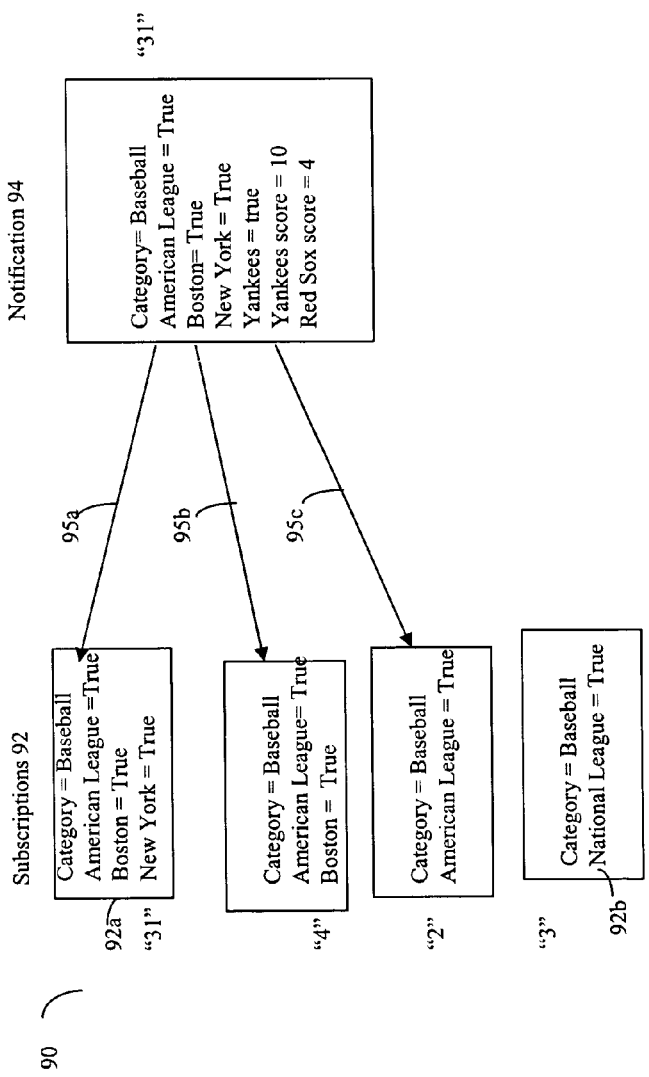
FIG. 2B is a representation of subscription and notification messages.

Referring now to FIG. 2B, shown is a representation 90 of one or more subscription messages 92 and notification messages 94. In the representation 90, the subscriptions 92 and the notification 94 are in the form of attribute-value pairs. The subscriptions 92 included in the left hand portion of 90 of FIG. 2B may represent four separate subscriptions submitted, for example, by multiple users to a subscription server 60. Prior to be submitted to the subscription server 60, each of the subscriptions 92 are first submitted to the preprocessor 54 for classification. For example, referring to subscription 92a, the preprocessor 54 may produce a preprocessed subscription message 58 that includes in the formatted header portion a node identifier "31" corresponding to node 84 of FIG. 2A. Similarly, each of the remaining subscriptions of 92 also have corresponding numerical node identifiers.

The preprocessor 54 parses the input of the subscription 92a and determines the one or more nodes in the representation 80 corresponding to that particular subscription. The formatted header includes a corresponding numerical value or token for the corresponding node or nodes within the content based graphical representation as shown in FIG. 2A. The subscription server 60 may then use the unique node identifier corresponding to the particular node within the graph 80 for processing described in following paragraphs. Similarly, the notification 94 may include attribute-value pairs that are submitted to the preprocessor 54. The preprocessor 54 may also determine one or more node identifiers corresponding to the notification message 94. The notification message may be, for example, a result from a baseball game as indicated by 94. The node identifier is included in the preprocessed notification message produced as an output by the preprocessor 54 for the notification message 94. The subscription server 60 may then take as an input the preprocessed notification message and may accordingly generate notification messages for the three subscriptions as indicated by the arrows 95a, 95b, and 95c in FIG. 2B. In this example, the notification message 94 has an associated node identifier of "31". With reference to the hierarchy of FIG. 2A and as will become apparent after presentation of techniques described in following paragraphs, the notification message with a node identifier of "31" is sent to all subscribers of "31" and any of node "31"s ancestors (1, 2, 4, and 10). With reference to FIG. 2B, notification 94 causes notices to be sent for all subscriptions included in 92 except for node 92b. Subscription 92b has a node identifier representing items not included in the foregoing notification set in accordance with the representation 80 of FIG. 2A. Additional detail of how a preprocessor determines one or more node identifiers for a given preprocessed message is described in more detail in following paragraphs.

In connection with a subscription message, a preprocessor may be included in an embodiment which returns a single node which exactly matches the subscription. For a notification message, the preprocessor may determine all nodes belonging to the superset graph for the notification. The superset graph includes all node in the graph that cover the notification which includes a node matching the notification and all ancestors of that matching node. In one embodiment all these nodes may be added to the preprocessed message header. In the foregoing, the preprocessed notification message header lists all node identifiers whose subscribers are to receive the notification.

In another alternate embodiment, the preprocessor may return a single node identifier corresponding to a notification message rather than a list of all nodes in the superset for the notification. In the alternate embodiment, the preprocessor may return for a notification message the set of lowest nodes in the graph that match the subscription. This set maintains the following invariants: all nodes in the set match the notification and no node in the set is an ancestor of any other node. It should be noted that this set may contain multiple nodes in the case where a notification is covered by multiple subscriptions and the subscriptions do not completely cover one another. In the case where the preprocessor returns only the lowest node(s) covering the notification, the routers determine the ancestors of the nodes in the notification header match the notification. In the case where the preprocessor determines all nodes covering the notification, all ancestors are explicitly included in the header and the routers do not need to determine the ancestors as with the latter.

It should be noted that whether one or more node identifiers are included in the formatted header 58 may vary in accordance with the particular implementation of the preprocessor and subscription server 60. What will be described is an embodiment in which the preprocessor determines a single node identifier for each subscription and notification message. It should be noted that also discussed elsewhere herein are alternate embodiments in which more than one node identifier may be returned as a result of preprocessing.

Referring back to FIG. 2, the preprocessor 54 and/or the subscription server 60 may be included in the server system 12 of the computer system 10 of FIG. 1. The subscription and notification messages 52 may be sent as an input from one or more of the host systems 14a-14n to the server system 12 over connection 18. As an output, the server 12 may produce a preprocessed message 58 returned to the host system which issued the original subscription or notification message. Subsequently, the preprocessed message may again be transmitted over connection 18 to the server system 12 to the subscription server 60 for processing.

Figure 3:
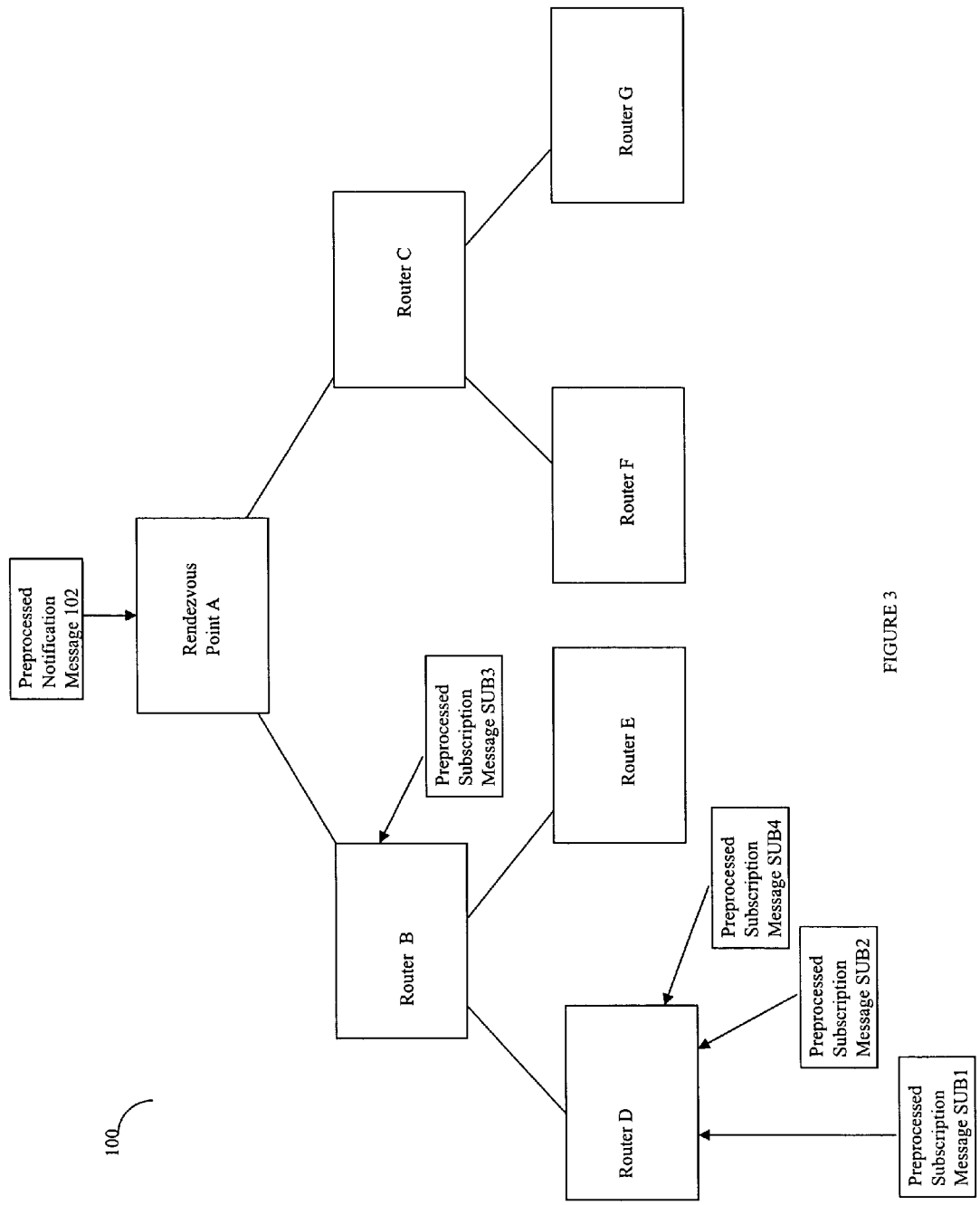
FIG. 3 is an example of an embodiment of a subscription server architecture.

Referring now to FIG. 3, shown is an example 100 of one embodiment of an architecture for the subscription server 60 and how preprocessed messages flow within the subscription server 60. The representation 100 in this embodiment includes a multicast subscription server with an overlay topology of routers illustrated in a tree-like structure. The tree-like structure includes a root or rendezvous point A connected to one or more levels of other routers within the subscription server. Incoming preprocessed notification messages, such as 102, are initially input to a rendezvous point A which is the root of the tree and are forwarded downstream toward the leaf routers, such as routers D, E, F and G. In contrast, preprocessed subscription messages, such as SUB1, SUB2, SUB3 and SUB4, are submitted to one or more of the routers and flow upstream toward the rendezvous point A of the representation 100.

Different processing techniques that will be described in following paragraphs are used in connection with propagating the data and information from the preprocessed notification messages and preprocessed subscription messages. Information is forwarded through the representation 100 using forwarding tables that contain content graph data included in the preprocessed messages. The information used in the routing of messages through the representation 100 is based on the node identifiers or tokens included in the formatted header 58 of the preprocessed message as shown in FIG. 2.

It should be noted that each of the routers and the rendezvous point router may be included in a single server system 12 as illustrated in connection with FIG. 1. Each of the different routers may be located physically on one or more different processors or server machines included in 12 of FIG. 1. An embodiment may use work load distribution techniques in connection with designating which router handles different subscription submissions. For example, in one embodiment, the preprocessed subscription message returned by the preprocessor to a client or user may also include a designation as to which router the user is directed for processing the returned preprocessed subscription message.

As will be described in following paragraphs, the routers included in the representation 100 use content graphs to store subscriptions and to disseminate notification messages to the appropriate subscribers.

Figure 3A:
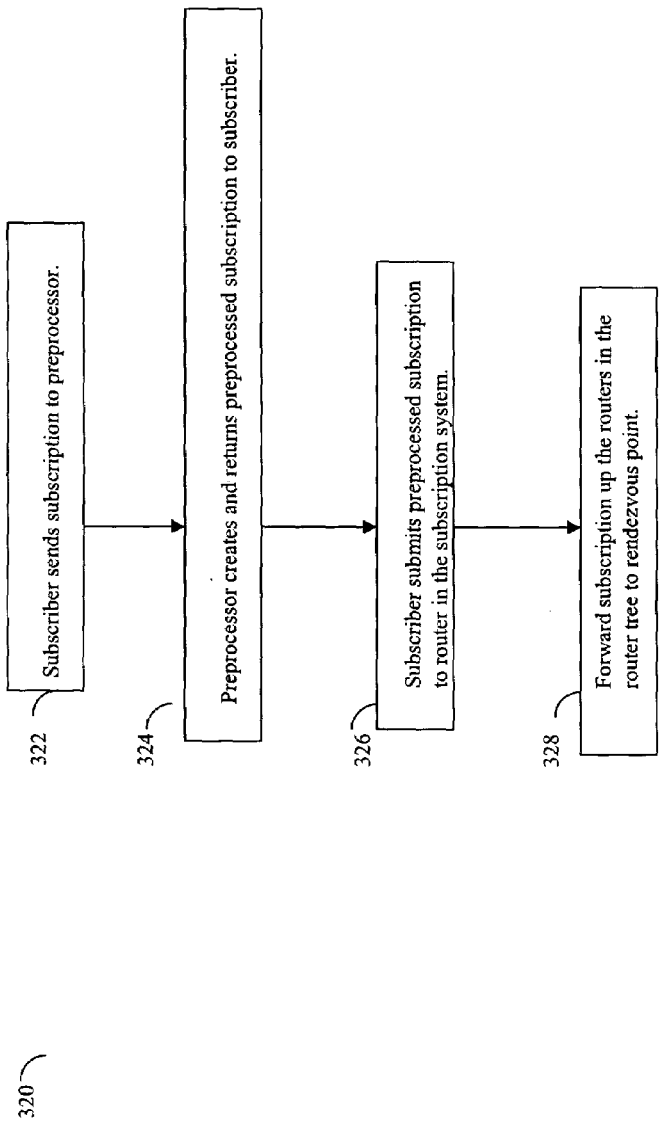
FIG. 3A is a flowchart of processing steps of one embodiment for processing subscription messages.

Referring now to FIG. 3A, shown is a flowchart 320 of processing steps that may be executed in an embodiment in connection with a subscription message. The steps of flowchart 320 summarize the data flow for a subscription previously described in connection with FIGS. 2 and 3. At step 322, a subscriber sends a subscription message to the preprocessor. At step 324, the preprocessor creates and returns a preprocessed subscription message to the subscriber. At step 326, the subscriber submits the preprocessed subscription to a router within the subscription server. At step 328, the preprocessed subscription message is forwarded up the tree of routers towards the rendezvous point.

Figure 4:
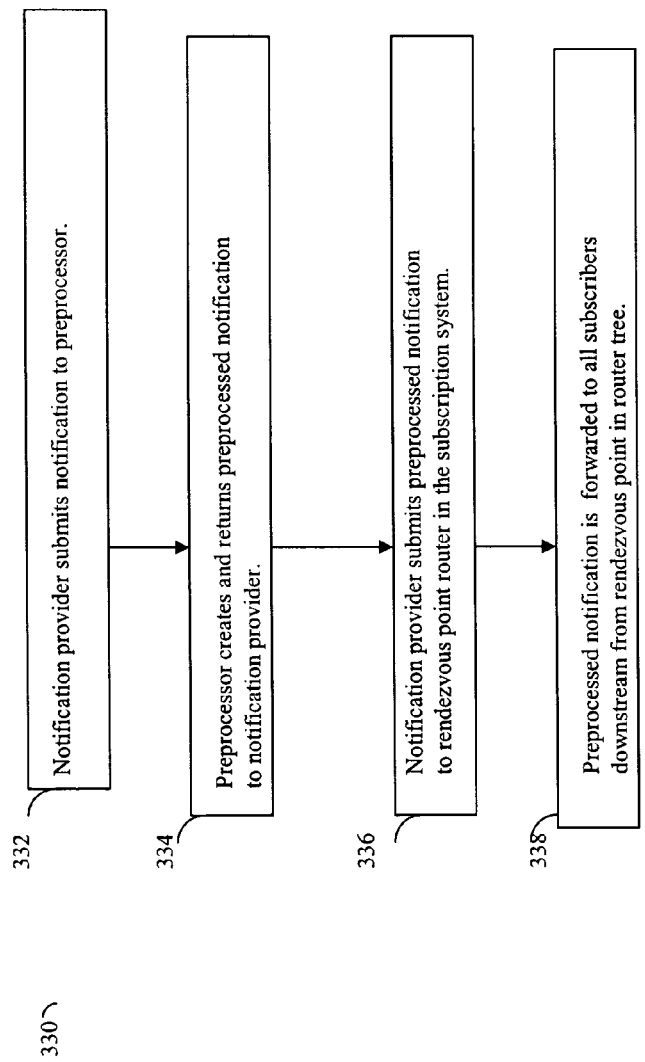
FIG. 4 is a flowchart of processing steps of one embodiment for processing notification messages.

Referring now to FIG. 4, shown is a flowchart 330 of processing steps that may be performed in connection with a notification message. At step 332, the notification provider submits the notification message to the preprocessor. At step 334, the preprocessor creates and returns preprocessed notification message to the notification provider. At step 336, the notification provider submits the preprocessed notification message to the rendezvous point or router within the subscription server. A preprocessed notification at step 338 is then forwarded downstream from the rendezvous point within the router tree and notification messages are sent out to subscribers.

Figure 5:
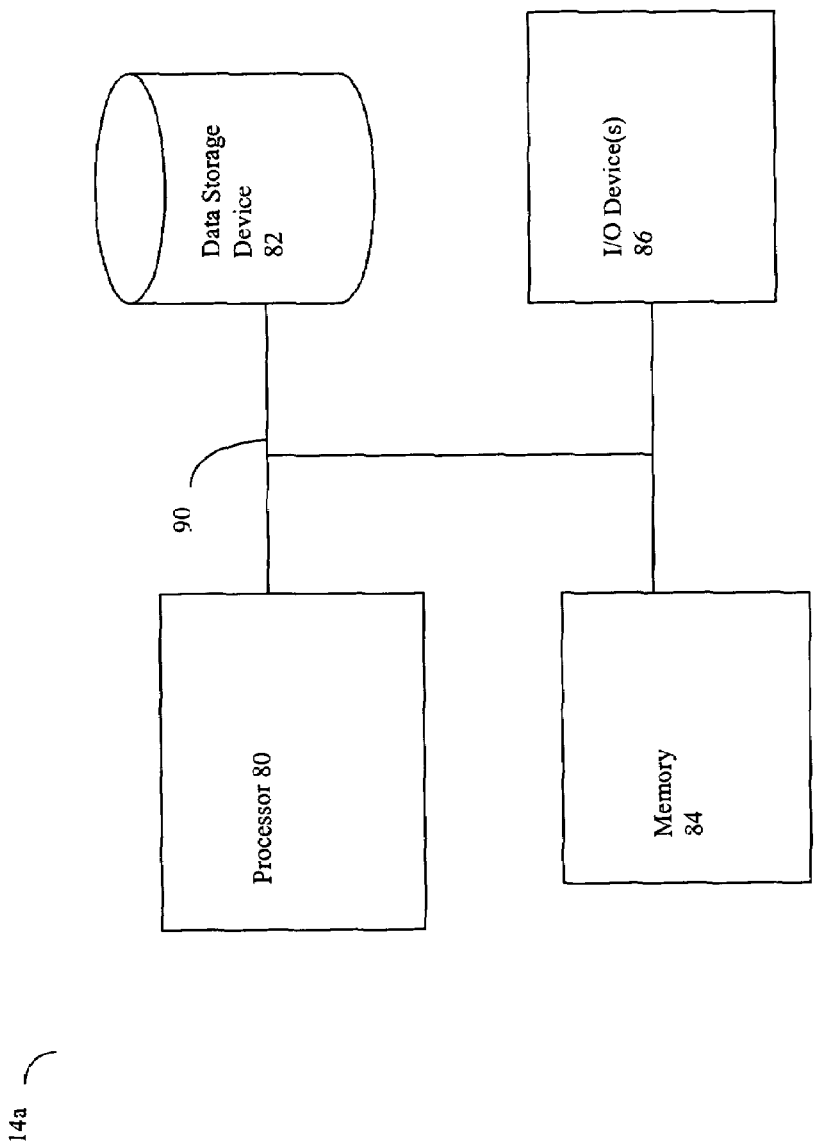
FIG. 5 is an example of an embodiment of components that may be included in a host system and/or server system.

Referring now to FIG. 5, shown is an example of an embodiment of a host system 14a. It should be noted that although a particular configuration of a host system is described herein, other host systems 14b-14n, and one or more hardware components included in the server system 12, may also be similarly configured. Additionally, it should be noted that each host system 14a-14n and the server system 12 may have any one of a variety of different configurations including different hardware and/or software components. Included in this embodiment of the host system 14a is a processor 80, a memory, 84, one or more I/O devices 86 and one or more data storage devices 82 that may be accessed locally within the particular host system. The data storage devices 82 may include a single device, such as a disk drive, as well as a plurality of devices in a more complex configuration, such as with a storage area network and the like. Data may be stored, for example, on magnetic, optical, or silicon-based media. Each of the foregoing may communicate using a bus or other communication medium 90. Each of the foregoing components may be any one or more of a variety of different types in accordance with the particular host system 14a.

Each of the processors included in the server system 12 and host computer systems 14a-14n may be any one of a variety of proprietary or commercially available single or multi-processor system, such as an Intel-compatible x86 processor, an IBM mainframe or other type of commercially available or proprietary processor, able to support incoming and outgoing traffic in accordance with each particular embodiment and application.

Instructions may be executed by the processor 80 to perform a variety of different operations. As known in the art, executable code may be produced, for example, using a linker, a language processor, and other tools that may vary in accordance with each embodiment. Instructions and data may also be stored on a data storage device 82, ROM, or other form of media or storage. The instructions may be loaded into memory 84 and executed by processor 80 to perform a particular task, such as those described herein in connection with the subscription system and its components.

In one embodiment, an operating system, such as the Windows operating system by Microsoft Corporation or the LINUX operation system, may reside and be executed on one or more of the computer systems included in FIG. 1.

Code may be executed by the processor, such as the one or more processors that may be included in an embodiment of the server system 12 and host systems 12a-12n, to perform processing steps described herein of FIGS. 3A and 4.

The preprocessor, rendezvous point, and/or other routers may store the entire content graph or portions of the content graph depending on the embodiment. What will be described is an embodiment in which each of the preprocessor and routers include those portions of the content graph in accordance with the particular subscriptions at a point in time. It should be noted that as used herein, a particular routers' "neighbor" may be a subscriber, or it may also be another router within the representation 100.

The routers of 100 may include forwarding tables designating how to route information within the subscription server. Additionally, in this embodiment, the routers store a portion of the content graph based on the particular subscription requests received by each router. Similarly, the preprocessor may include only those nodes for subscriptions it has preprocessed and additional nodes are added as new subscription requests are preprocessed. As pointed out above, an embodiment may alternatively store the entire content graph in the preprocessor and/or routers independent of whether a particular subscription request has been received by the component. However, for the purposes of illustration of the techniques described herein, a minimal or reduced content graph may be stored and used by each of the routers and preprocessors in accordance with received messages.

Figure 6:
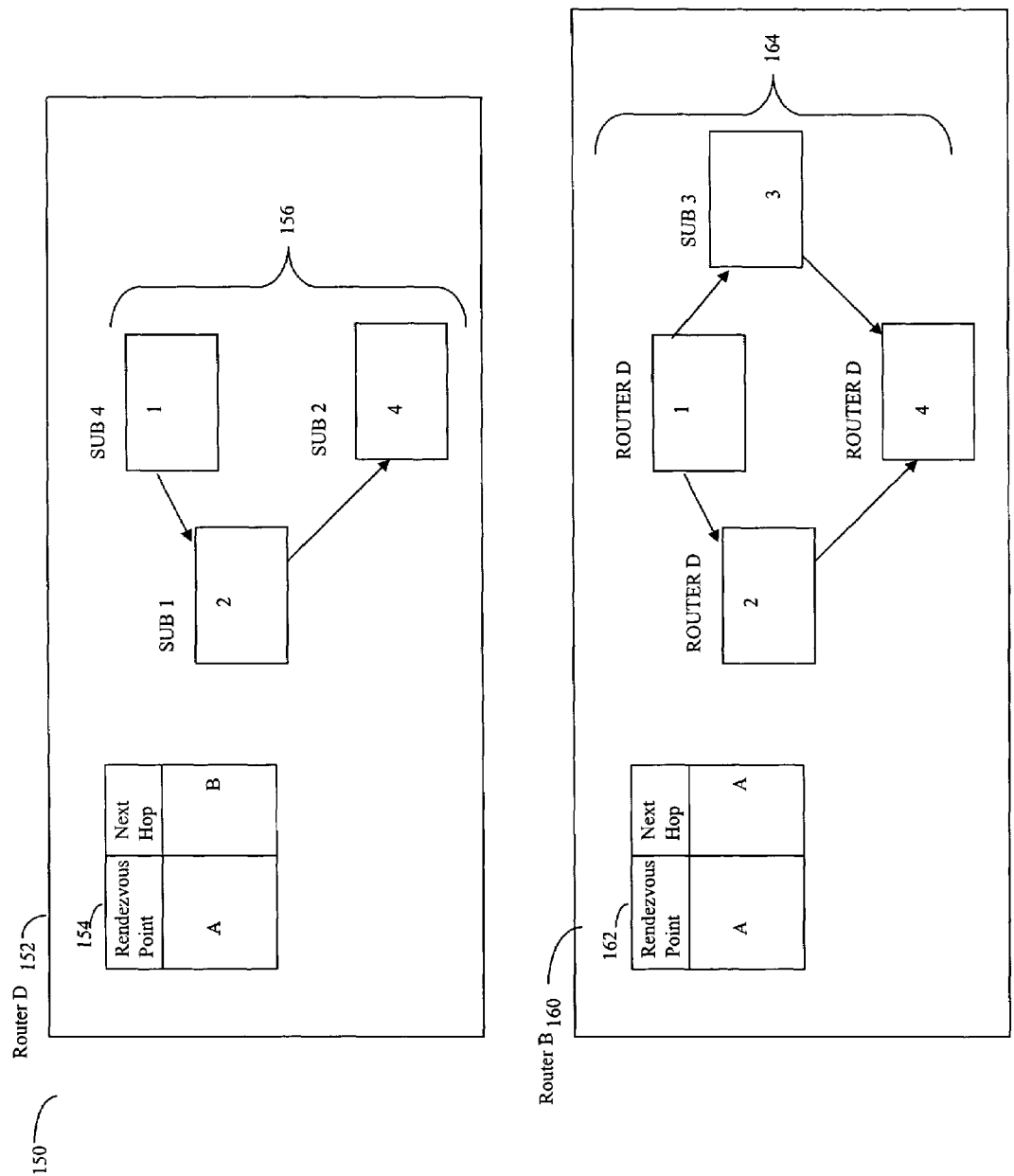
FIGS. 6 and 7 are example representations of information stored in the routers and preprocessors in an embodiment of a subscription system.

Referring now to FIG. 6, shown is a representation 150 of the particular tables that may be stored within the routers D and B of the subscription server 60 from FIG. 3. In this example, router D may include information from 152. Router D may include a forwarding table 154 indicating which is the next hop (B) in the path to the designated rendezvous point upstream for forwarding subscription messages upstream. Additionally, the router D may include a content graph as represented by 156 in accordance with the particular subscriptions submitted through router D. In this example, router D has three subscription messages for SUB1, SUB2 and SUB4. The preprocessed subscription message for SUB1 indicates that node identifier 2 corresponds to that particular subscription request. Similarly, the preprocessed subscription message for SUB2 corresponds to node identifier 4, and the preprocessed message for SUB4 corresponds to node identifier 1. Accordingly, nodes are included in the content graph 156. The relationship between these three subscription message categories in a hierarchal representation is shown in 156 by the edges connecting the nodes. Additionally, each node in the reduced or minimal content graph 156 may include a list of subscribers for that particular node. For example, node 2 in 156 has SUB1 as a subscriber, node 4 has SUB2 as a subscriber, and node 1 has SUB4 as a subscriber. The content graph and subscription lists may be used in forwarding notification messages to subscribers.

Element 160 includes information that may be stored within router B. Router B includes forwarding table 162 indicating that the next hop on the path to the rendezvous point A is the rendezvous point itself. Router B may also include the content graph representation 164 indicating which elements are particular subscribers with respect to router B. In the representation 164, router B has SUB3 as a neighbor or subscriber for node 3 content. Additionally, router B has a router D as a neighbor to which it forwards notification messages for particular node identifiers 1, 2 and 4.

As will be described in more detail in following paragraphs, the routers use the information in the minimal or reduced content graph such as 164 and 156 to determine which subscribers receive notification messages. Similarly, each of the routers also use forwarding information, such as included in 154 and 152, to determine where to forward subscription information upstream toward the rendezvous point.

Figure 7:
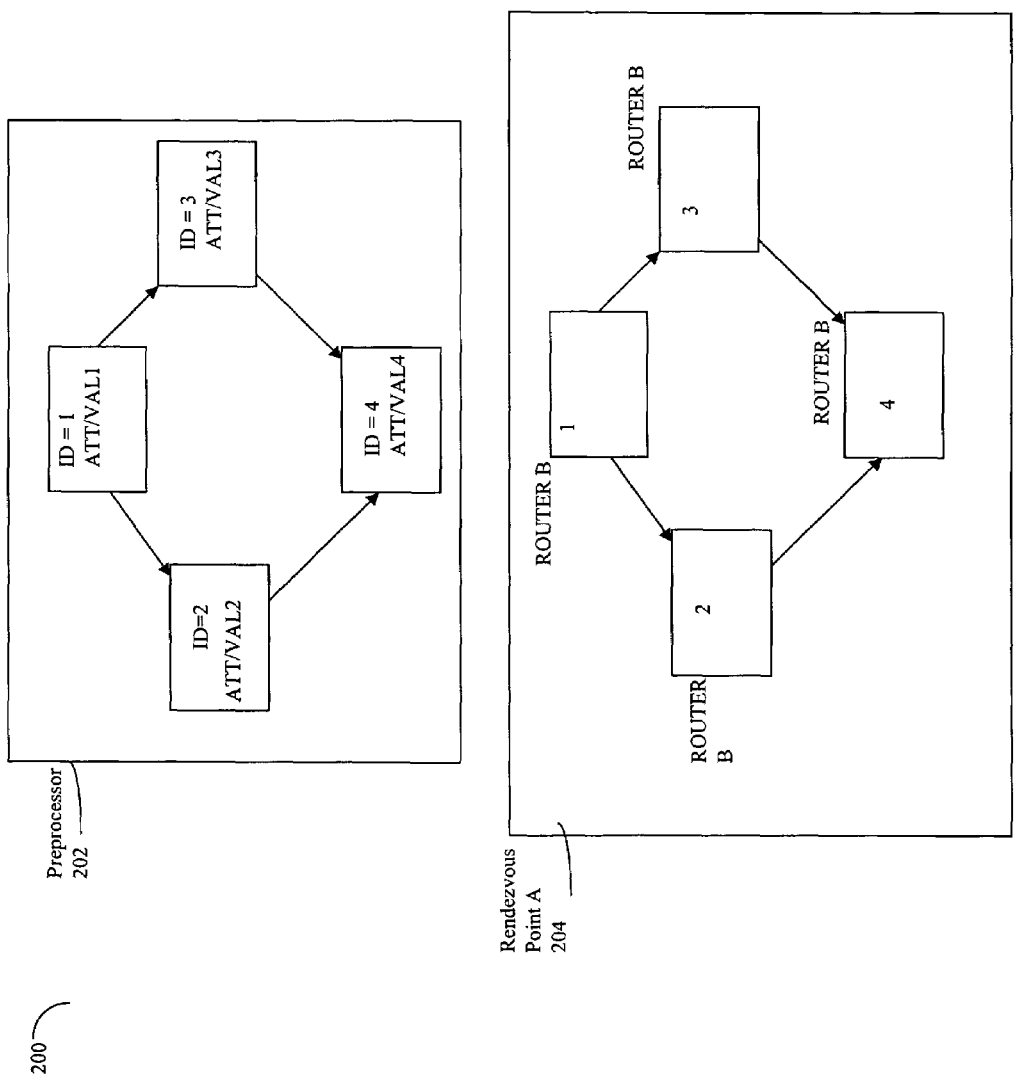
Figure 9A:
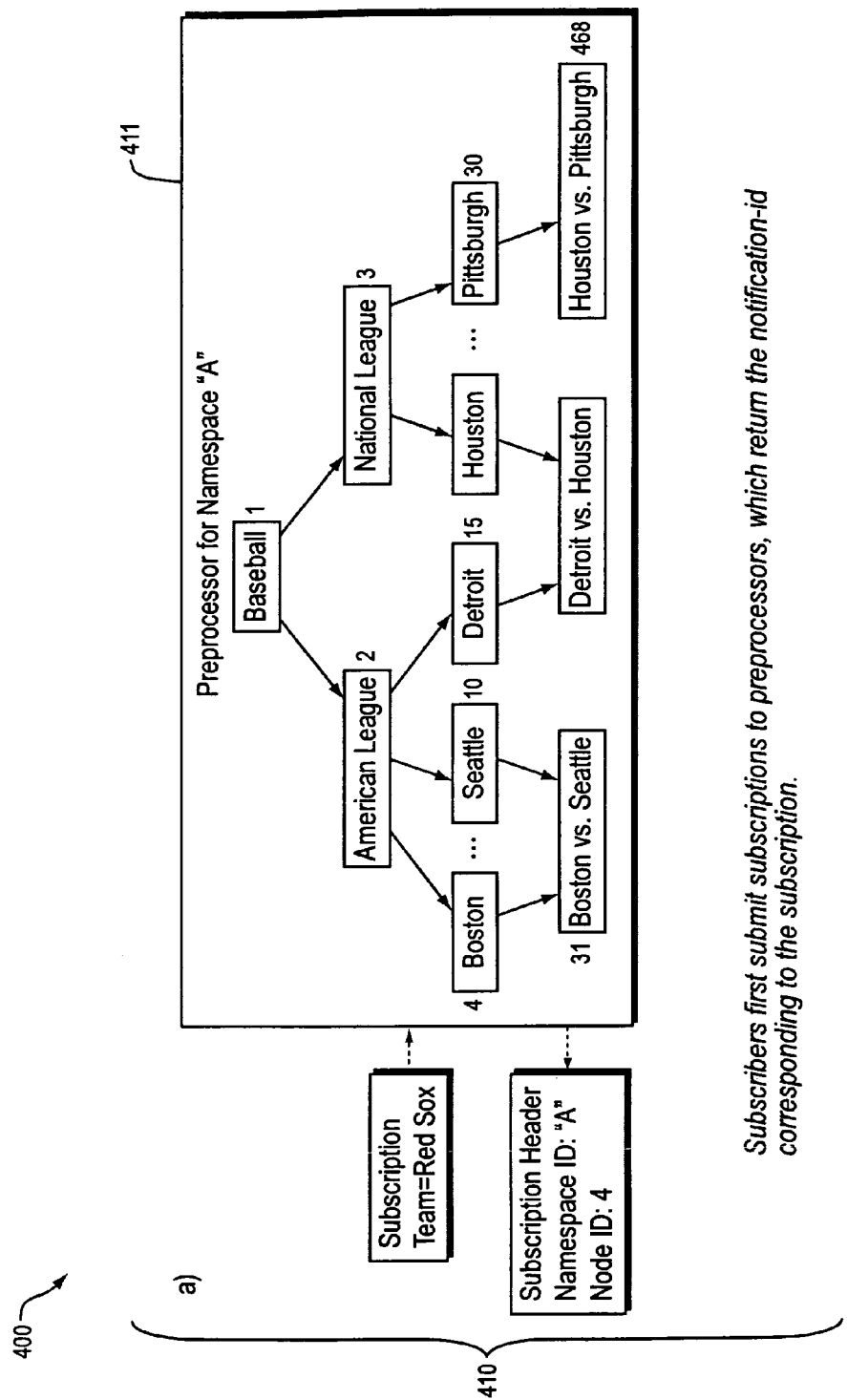
FIGS. 9A-D and 10A-B are examples illustrating the steps of FIG. 8 in a subscription system.
Figure 9B:
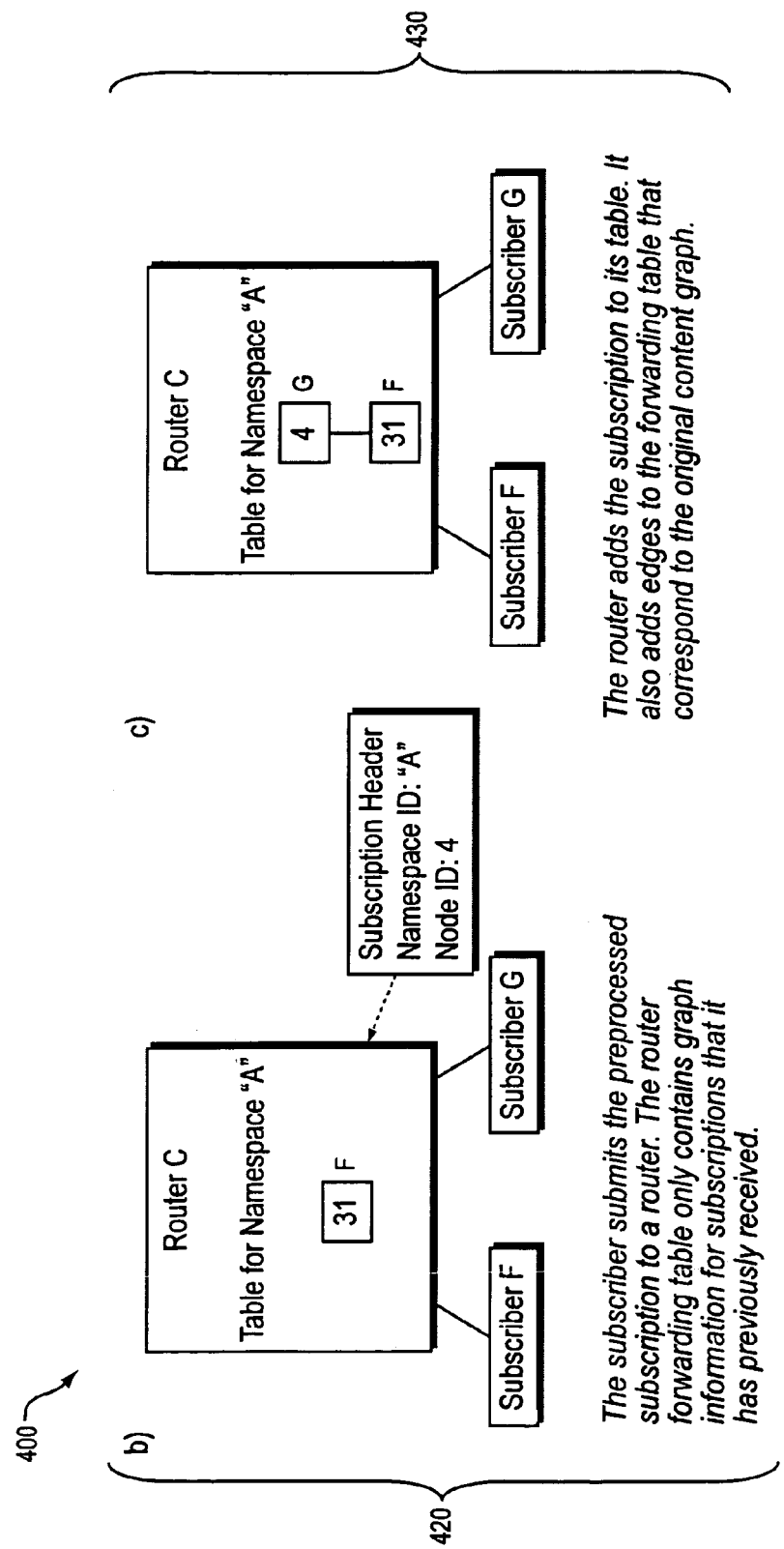
Figure 9C:
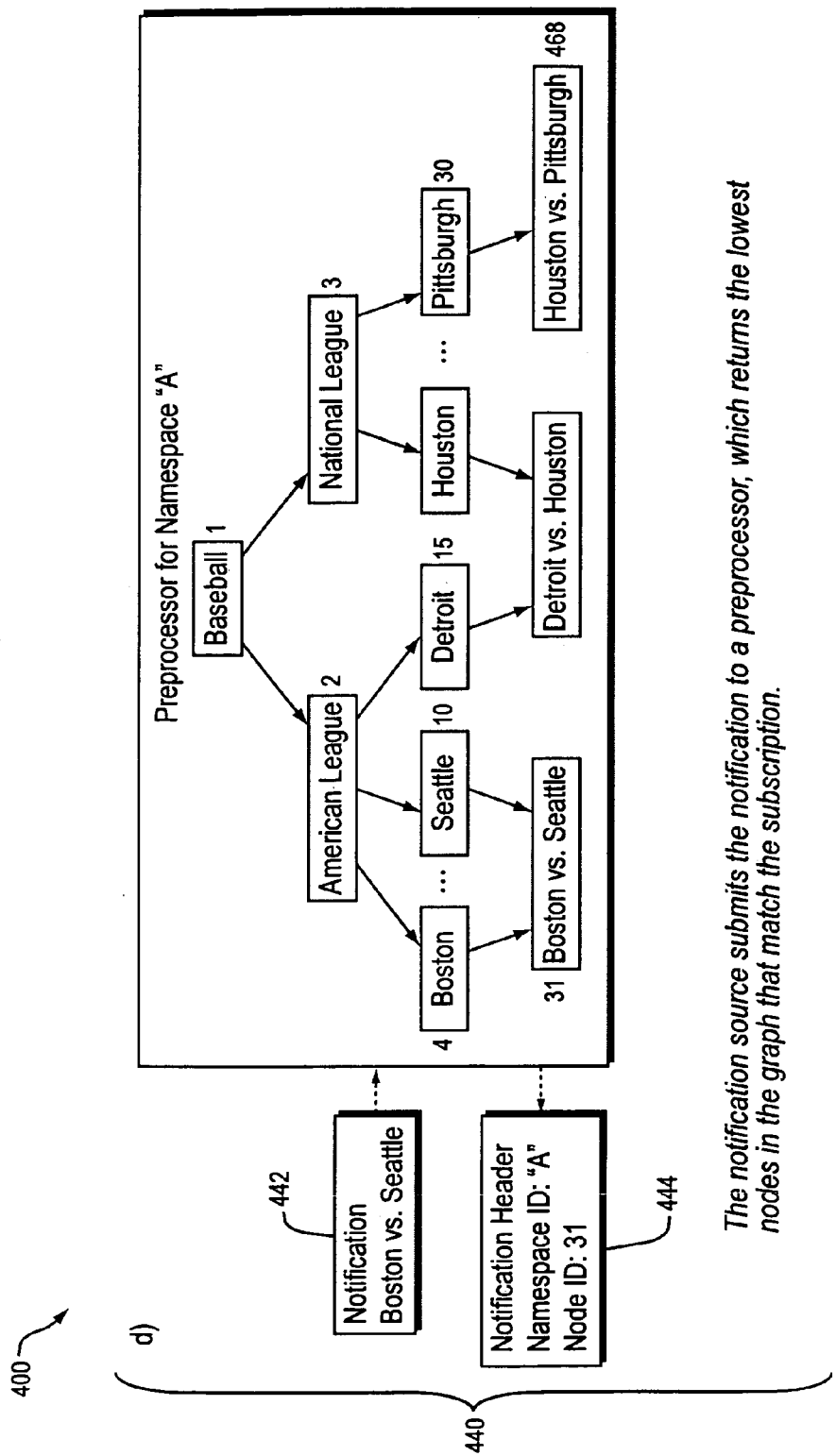
Figure 9D:
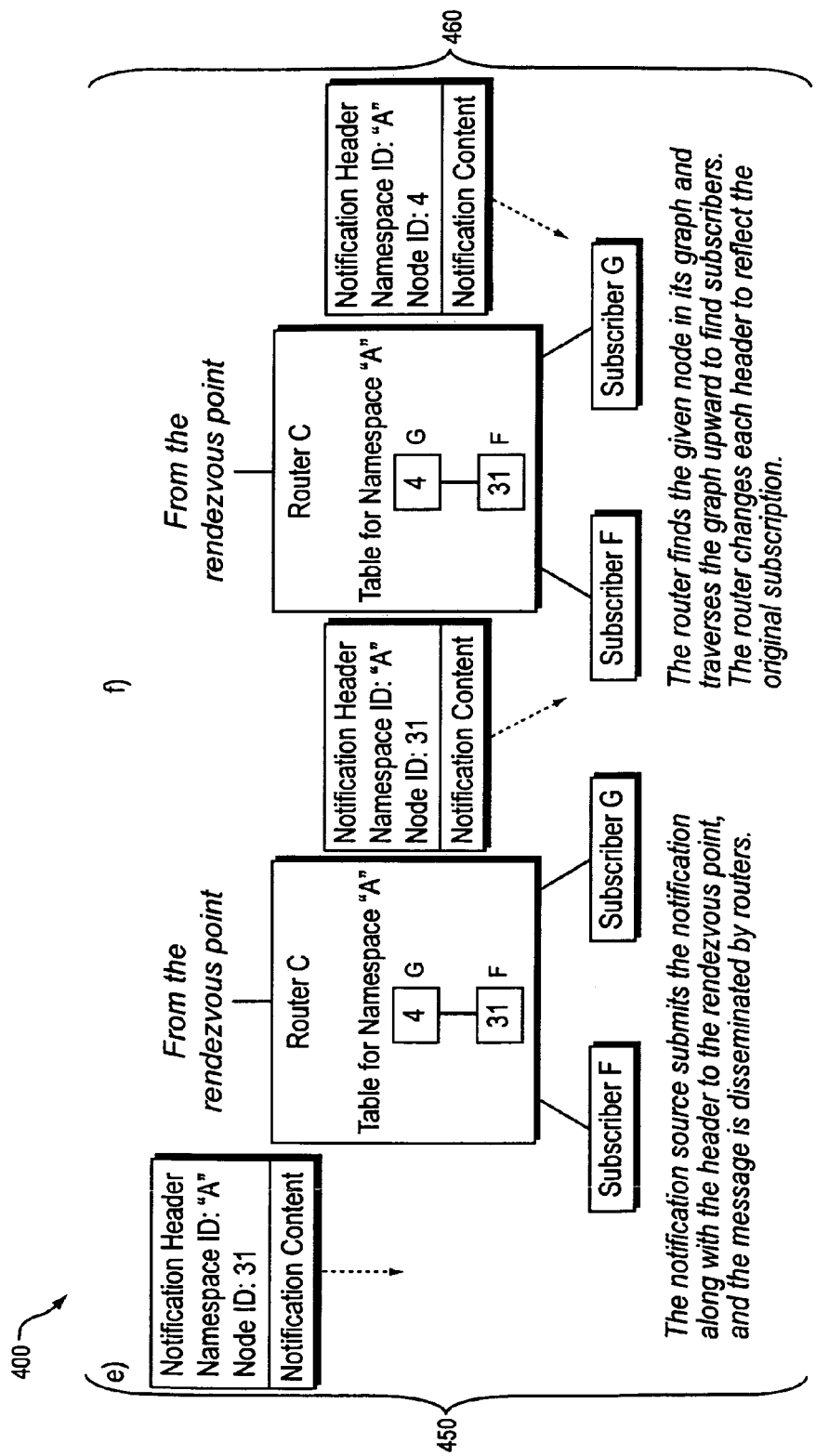

Referring now to FIG. 7, shown is a representation of information that may be included within the rendezvous point 204 and the preprocessor 202 in this embodiment. The preprocessor 202 includes the appropriate attribute-value information and mapping for the particular node identifier returned by the preprocessor for a given subscription or notification message. As will be described in following paragraphs, the rendezvous point A or other routers located higher upstream from a router may be queried as part of processing to obtain information of how particular nodes are to be included in a content graph when each router stores a minimal or reduced content graph.

It should be noted in an embodiment in which each of the different routers store a complete content graph rather than a reduced or minimal graph as illustrated in FIGS. 5 and 6, the routers do not need to query the rendezvous point A regarding graph information, for example, when adding a node to the partial content graph maintained by a router.

As described above, the content graph may be characterized as including subscription content and information that changes dynamically in accordance with the subscriber requests and topics. In an alternative embodiment, the content graph maintained at a rendezvous point and/or other routers may be a static representation of a subscription topic area, such as a complete hierarchical representation of topics which does not change in accordance with the subscriptions actually received. The static content graph may be initially input and may be changed when there is a change to the static content source, such as when an administrator makes an update or modification. It should be noted that a preprocessor may also include a static representation of information used to determine node identifiers. As described above, the preprocessor may also be characterized as a dynamic preprocessor which includes graph information and creates new identifiers in a hierarchical representation as new subscriptions are processed. An embodiment may also include a preprocessor having some traits of both the static and dynamic preprocessor. For example, the preprocessor may lookup and retrieve content graph identifier information from previously generated tables as new subscriptions are received.

In an embodiment which uses static content graphs in preprocessors, rendezvous points, and/or routers, it will be appreciated by one of ordinary skill in the art that any one of a variety of different techniques may be used in connection with synchronizing and maintaining consistency between the different content graph information. For example, a primary copy of the content graph information may be maintained with updates propagated for use by each component in the subscription system. An embodiment may wait for a response from each component indicating a successful update to an existing content graph copy maintained locally at each component to the primary copy prior to performing any further processing of subscriptions and/or notifications.

Referring now to FIG. 8, shown is a representation of processing steps that may be performed in an embodiment in connection with preprocessed subscription and notification messages received by a subscription server using the reduced or minimal content graph in the routers. Element 360 includes a pseudocode representation of processing steps that may be performed by a router in the subscription server in response to receiving a preprocessed subscription message. The steps described by the pseudocode representation of 370 represent the processing steps that may be performed by a router in response to receiving a preprocessed notification message. It should be noted that as described herein, each of the subscription and notification messages have been previously processed by the preprocessor also described herein. In the representations of 360 and 370 of FIG. 8, a "neighbor" of a router performing the processing may be either another router or a subscriber. When a subscription is received by a router, a determination is made as to whether the node identifier of the subscription is already included in the content graph as maintained by the router. If not, that particular router obtains graph information at step 362 in order to properly insert the new node into the content graph. How a particular router may obtain the necessary graph information, such as the edge information describing the particular relationship between the new node to be added and the existing nodes in the graph, is described in more detail elsewhere herein. In one embodiment, the processing for 362 to get graph information may include querying routers upstream until one is found that can answer the query. In the worst case, the query is propagated back to the rendezvous point and then passed downstream. The content graph representation also includes a list of particular subscribers to that particular node in the content graph. An element is added to the subscription list for the node corresponding to the subscription at 363a. If the node in the content graph is newly added such that it has no previous subscribers, the subscription is forwarded towards the rendezvous point up the tree of routers at 363b. As the subscription is forwarded upstream toward the rendezvous point, each intervening router also adds the subscription information to its content graph in order for the appropriate information when a notification is received to flow from the rendezvous point to the subscribers by performing the steps of 350.

When the router receives a notification, the processing steps of the pseudocode representation 370 may be performed. Processing of the pseudocode representation 370 provides for finding a superset graph for the notification as represented by 372. Additionally, a list of neighbors holding subscriptions to nodes in the superset graph are determined by steps of 373. The router then forwards a copy of the notification to those neighbors. When a neighbor does not hold a subscription to one of the nodes listed in the notification header, the router changes the notification header of the message. Specifically, the router determines the lowest set of nodes in the superset graph for which the neighbor holds a subscription. The router then modifies the header of the notification to specify this set of nodes. If the router did not change the header of the message, the downstream neighbor would receive notification or node identifiers for which it had no subscribers. This translation is performed at step 374 is described in more detail in following paragraphs.

The foregoing approach using a minimal or reduced content graph eliminates the steps of updating all routers when graph nodes are added to a content graph. Additionally, it reduces the amount of storage required for each router. Routers within the network are updated in accordance with when subscriptions are received.

Referring now to FIGS. 9A-9D, shown is an example 400 illustrating the use of the techniques described in connection with FIG. 8 for subscription and notification processing using the minimal content graphs. In other words, the example 400 illustrates the use of the minimal graph information and associated subscription lists for forwarding notification messages. As illustrated in 410, subscribers first submit subscriptions to the preprocessors as described elsewhere herein returning a node identifier corresponding to the particular subscription. As illustrated in 420, the subscriber then submits the preprocessed subscription to a router which in this example is router C. The router forwarding table as included in the content graph for use in connection with forwarding notification messages contains only graph information for subscriptions previously received. In this example, a single subscriber F has a subscription currently for node identifier 31. Subsequently, subscriber G submits a preprocessed subscription message or node id 4. Element 430 indicates the state of the graph with forwarding or subscription information as maintained by router C after router C has updated its subscription information in accordance with subscriber G's new subscription 4 node identifier 4. As illustrated in 440, a notification message 442 is submitted to the preprocessor which produces as output a preprocessed notification message 444. This is a notification message for node identifier 31. In this example, the preprocessor returns the lowest nodes within the graph that match the subscription. As illustrated in 450, the notification source then submits notification message 444 to the rendezvous point which then further forwards the notification message down to router C. In 460, router C finds the given node from the notification message within its graph and traverses the graph upward using the bottom up breath first graph traversal to find subscribers. The router also changes each header of the notification message sent to the various subscribers to reflect the original subscription. For example, in 460, the notification message is for node identifier 31. As indicated by the graph, a notification message is sent to all subscribers of the given node 31 and any of the node 31's ancestors (4 in this instance). However, rather than send a notification message including the node identifier 31 for each of the subscribers, the router may change as necessary the header within the notification message to a different node identifier representing a more general categorical classification including the node identifier 31. In this example 460, node identifier 4 represents a more general classification or superset including node identifier 31. Accordingly, subscriber G's notification message has a modified node identifier to include 4 rather than 31. Since subscriber F originally subscribed to node identifier 31, subscriber F's notification message includes the node identifier 31 rather than a modified identifier.

Figure 10A:
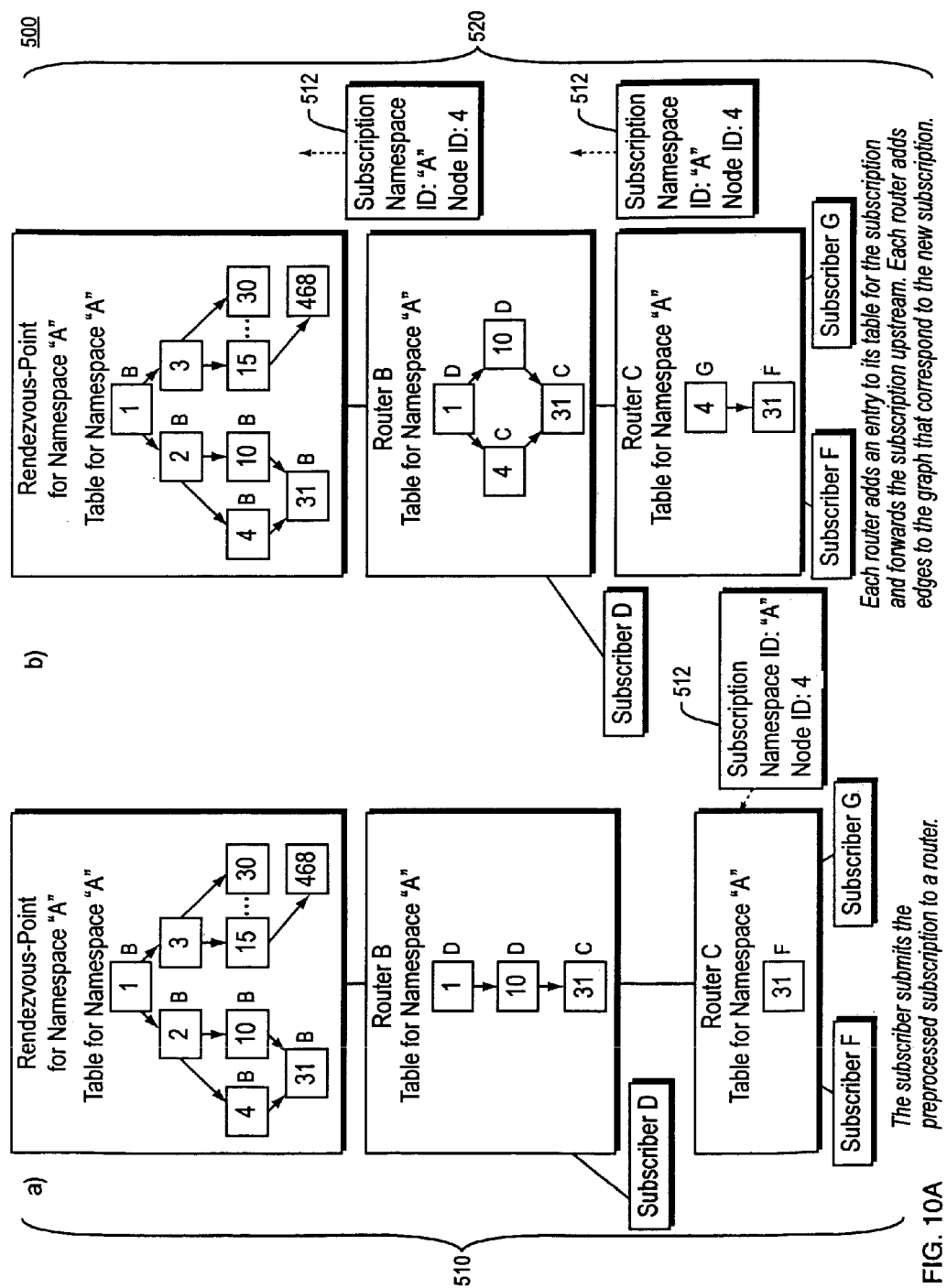
Figure 10B:
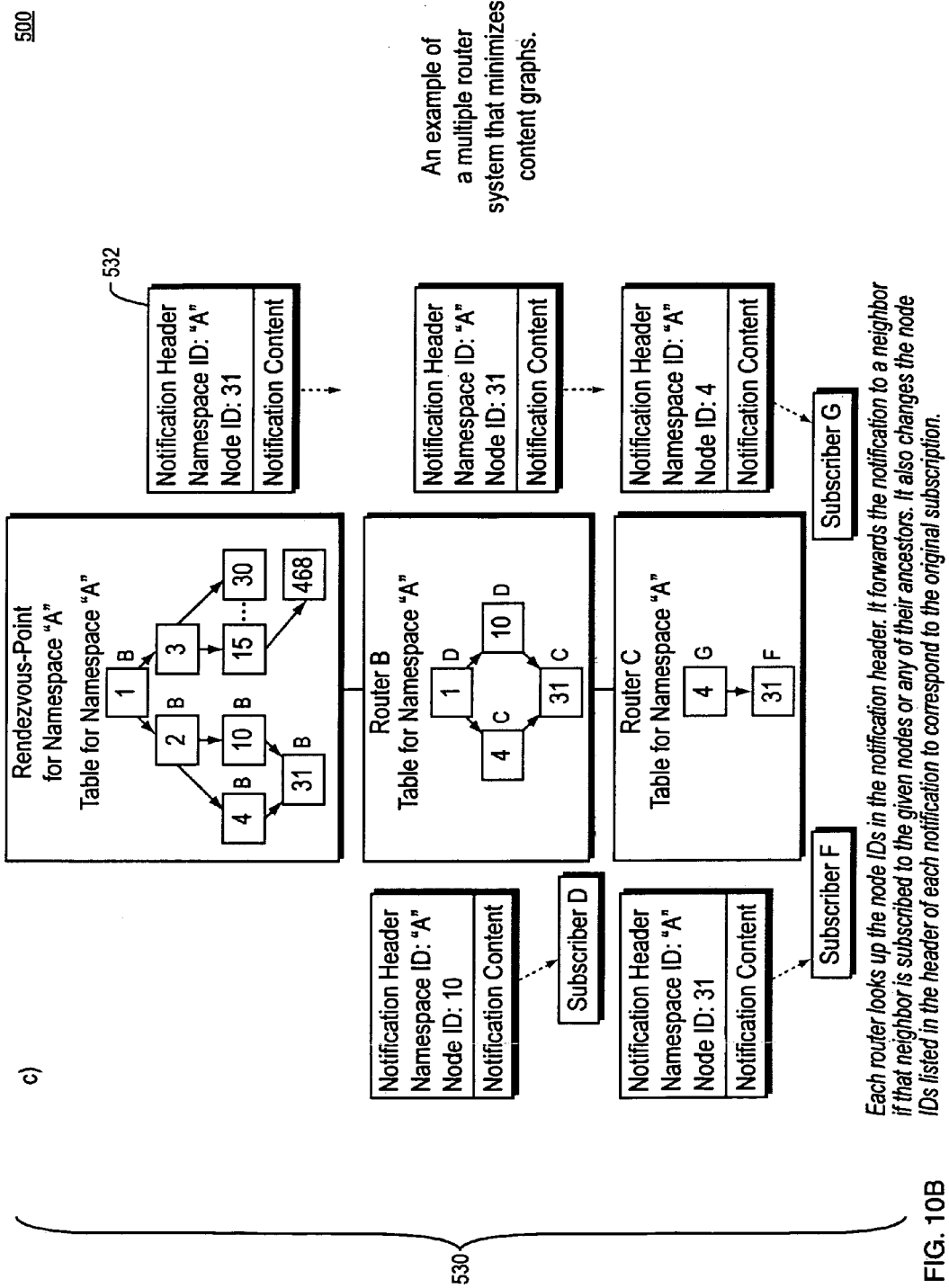

Referring now to FIGS. 10A-10B, shown is an example of a multiple router system using the minimal content graphs and associated subscription lists for forwarding notification messages. Referring to element 510, a subscriber G submits a preprocessed subscription message to 512 to router C. As illustrated in 520, the subscription message 512 is forwarded up the router tree to the rendezvous point with each router at the level going up the tree adding an entry to its corresponding content graph for the subscription and further forwarding the subscription upstream. Each router adds edges to its graph corresponding to the new subscription node identifier and also adds the new subscription to the list so that alert or notification messages when received are forwarded to the appropriate subscriber. Element 530 illustrates processing a notification message 532 received at the rendezvous point. The notification message is forwarded downstream from router or rendezvous point A to router B and then subsequently to router C. Each of the routers looks up the node identifiers in the notification header of the notification message. The router then forwards the notification to the neighbors that have subscribed to the given nodes or any of their ancestors. Additionally, the router performs a translation or modification to the node identifiers listed in the header of each notification message forwarded downstream to correspond to the original subscription. In other words, a router forwarding a message downstream may translate or modify the node identifier of the notification message to that of the recipient neighbor which may be a subscriber or other router downstream.

Figure 10C:
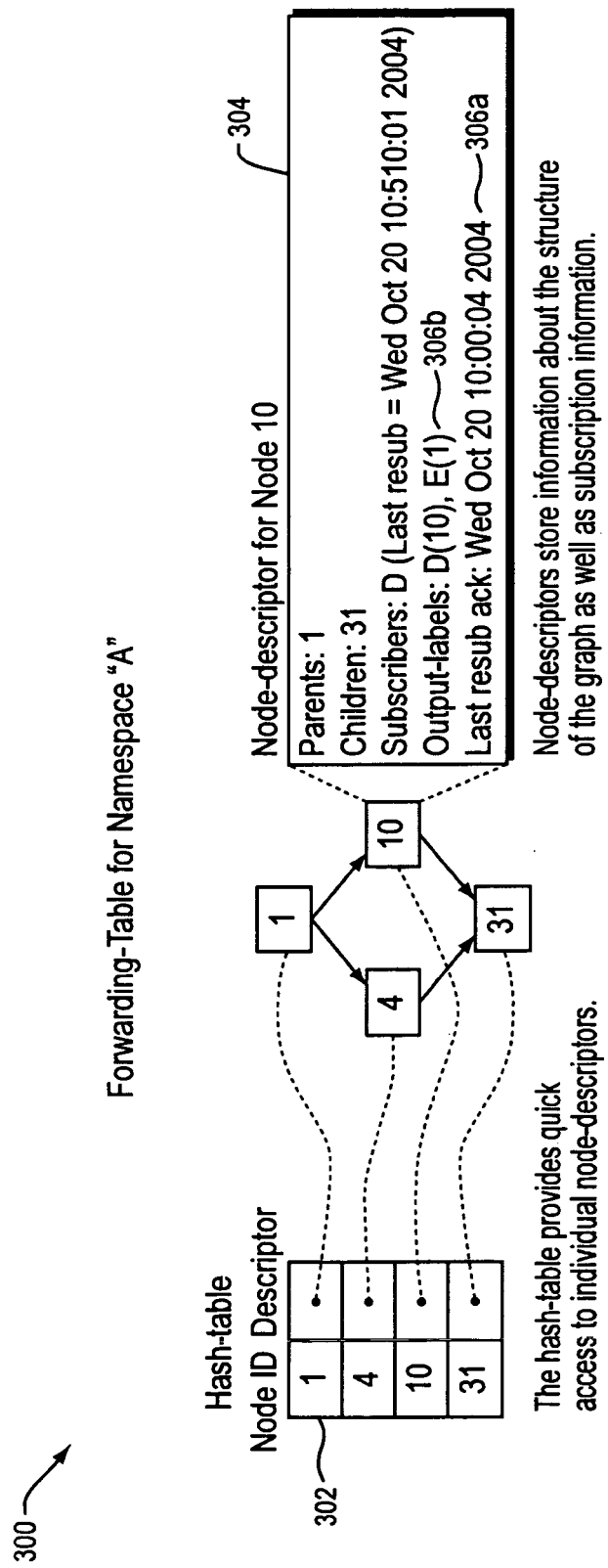
FIG. 10C is an example representation of a data structure of a content graph with node descriptors.

Referring now to FIG. 10C, shown is an example representation of a data structure that may be used in connection with the content graph and associated subscription list for forwarding information within the subscription server. In particular, the representation 300 includes a hash table 302. The hash table 302 includes a column of node identifiers and a column of pointers to associated node descriptors. In the representation 302, the node identifier may be hashed to a particular entry in the hash table 302. In this particular embodiment, any one of a variety of different hashing techniques may be used to map a particular node identifier to its corresponding node descriptor vis-à-vis the hash table. In this example, the descriptor may be a record or other structure.

Element 304 shows additional detail of one embodiment of a descriptor. The descriptor 304 for a node includes parent and child node identifiers with respect to the corresponding node in the content graph, a list of subscribers, as well as additional information. This additional information may include, for example, a time stamp value 306a indicating when a resubscription or repeated subscription was last received from an upstream neighbor. As described elsewhere herein, this timestamp value may be used to determine when an upstream neighbor has dropped a subscription. The descriptor 304 may also include a list of output labels used to determine which neighbors receive a copy of a received notification message. The use of output labels is described elsewhere herein in more detail.

In this embodiment, the node descriptor may be used to store information about the structure of the content graph itself as well as the subscription information. The pointers included for the appropriate parent and children of a particular node such as node identifier 10 result in a logical representation as also shown in FIG. 10C.

In an embodiment, a router may also reduce notification processing time in connection with processing a notification message by determining forwarding information when subscription requests arrive at the routers using output labels, such as 306b of FIG. 10C. As described herein so far, routers may find information about superset graphs when they receive notifications for particular sets of node identifiers. Routers then use this superset information to forward notification messages. An embodiment may also have a router precompute as much forwarding information as possible upon receipt of a subscription. In one embodiment which may optionally perform the precomputation of forwarding information for notifications, each node in a router graph may be annotated with output labels. Each output label may contain precomputed information that the router would otherwise gather while processing notifications. Each output label may indicate two elements. The output label may indicate which neighbors should receive copies of a notification marked with the given node identifier. Secondly, the output label may indicate what headers of outgoing notifications should contain.

Output labels may be determined in one embodiment as follows:

If neighbor i holds a subscription to node v in the graph, then the output label $o_{v,i}$ for node v and i is v.

If neighbor i does not hold a subscription to node v in the graph, then the output label $o_{v,i}$, specifies the lowest nodes in the supergraph for v for which i holds a subscription.

Referring now to FIG. 10D, shown is a representation 800 of additional processing steps that may be performed in an embodiment for output labels. Element 820 specifies processing that may be performed to set up subscriptions using output labels. When a router receives a subscription for a given neighbor, i, the router finds the node in its graph that matches the subscription node, v, (adding new nodes as needed at 822a) and adds the subscription for i to v at 822b as described elsewhere herein. The router then checks the output labels of v's descendants to see whether they are affected by the new subscription by performing the steps of 840. The router first finds the current output labels for v, $o_{v,i}$ at 842a and then finds the set of all of v's descendants, the set Dv at 842b. For each descendant d in Dv, the router checks the descendant's current output labels, $o_{d,i}$ at 844. If none of the nodes listed in $o_{d,i}$, is in v's descendant set, Dv, then the router removes all of v's output labels $o_{v,i}$ from $o_{d,i}$, at 844a. The router adds a new output label to d's output labels $o_{d,i}$, for v and i at 844b. The router changes the output labels for v and i to indicate a single node, v at 846.

Element 860 sets forth processing steps that may be performed in connection with notification message processing using the output labels. When the router receives a notification, the router finds the corresponding output labels for each of the nodes in the header notification. Specifically, with processing of 862 for each node in the header notification, v, and each neighbor i, the router finds the output label $o_{v,i}$. The router creates a header for neighbor i, hi, by adding the nodes in $o_{v,i}$ to hi at 864. Once the router has finished processing all the output labels for the given nodes, the router processes all of the headers created at 866. If the router has a header hi for one of its neighbors, i, the router forwards a copy of the notification to neighbor i with header hi.

Figure 10F:
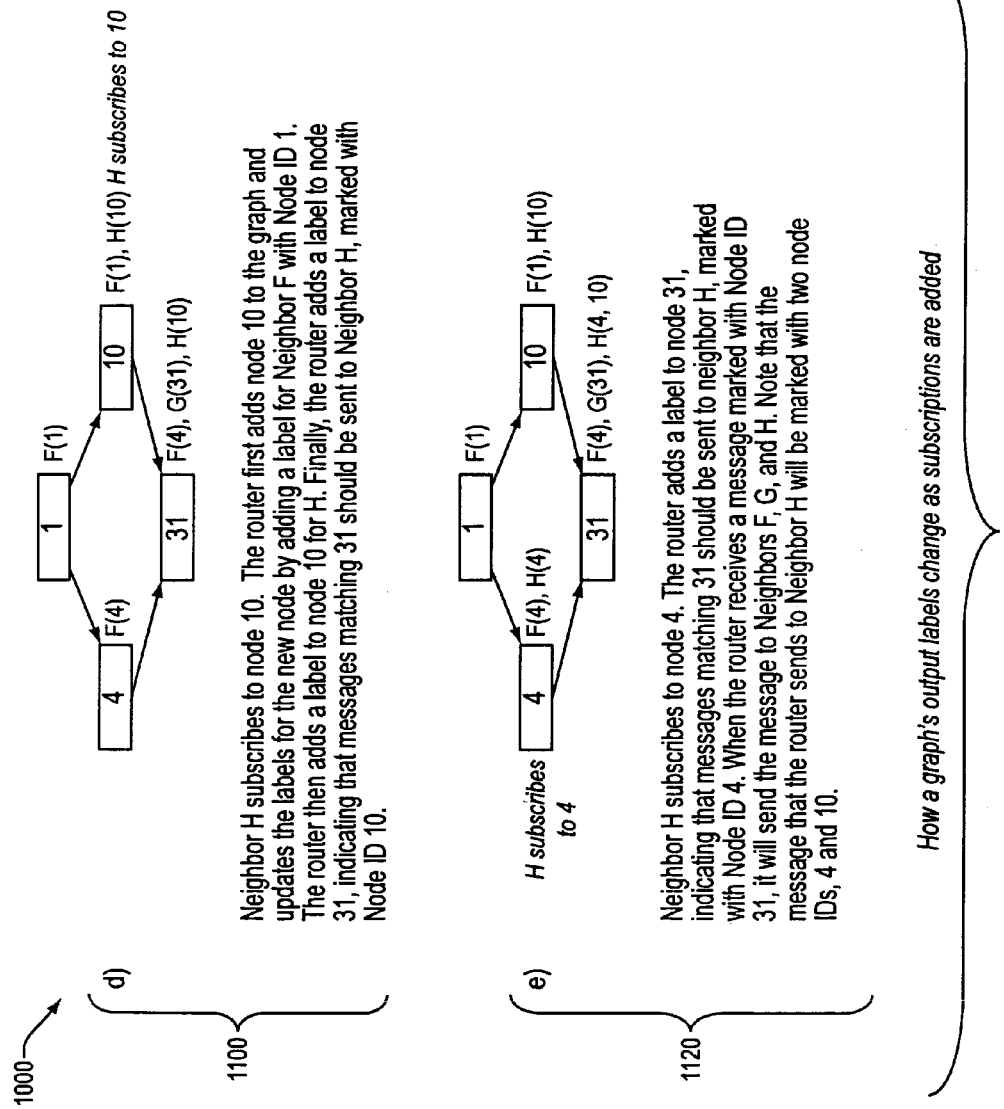
Figure 10G:
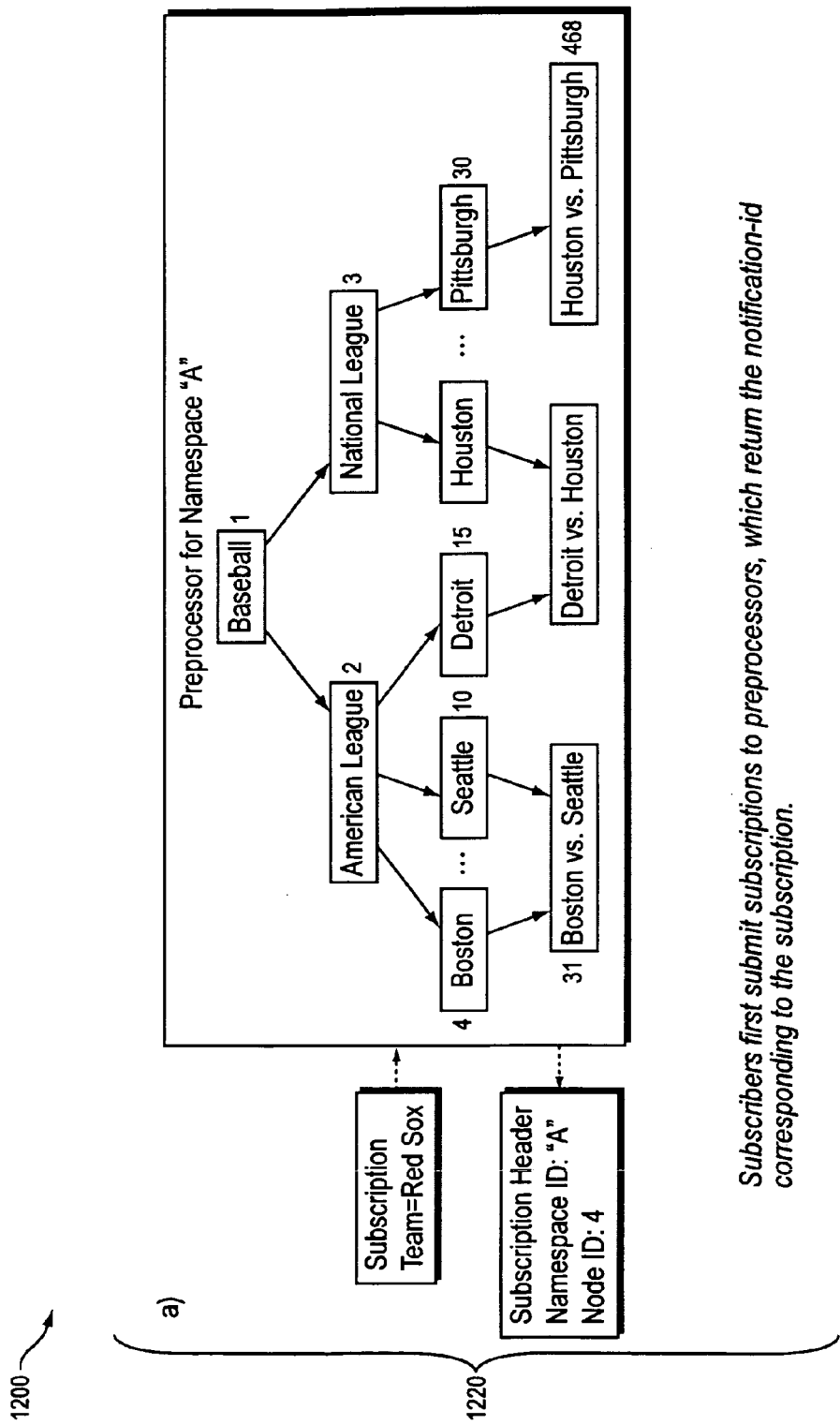
Figure 10H:
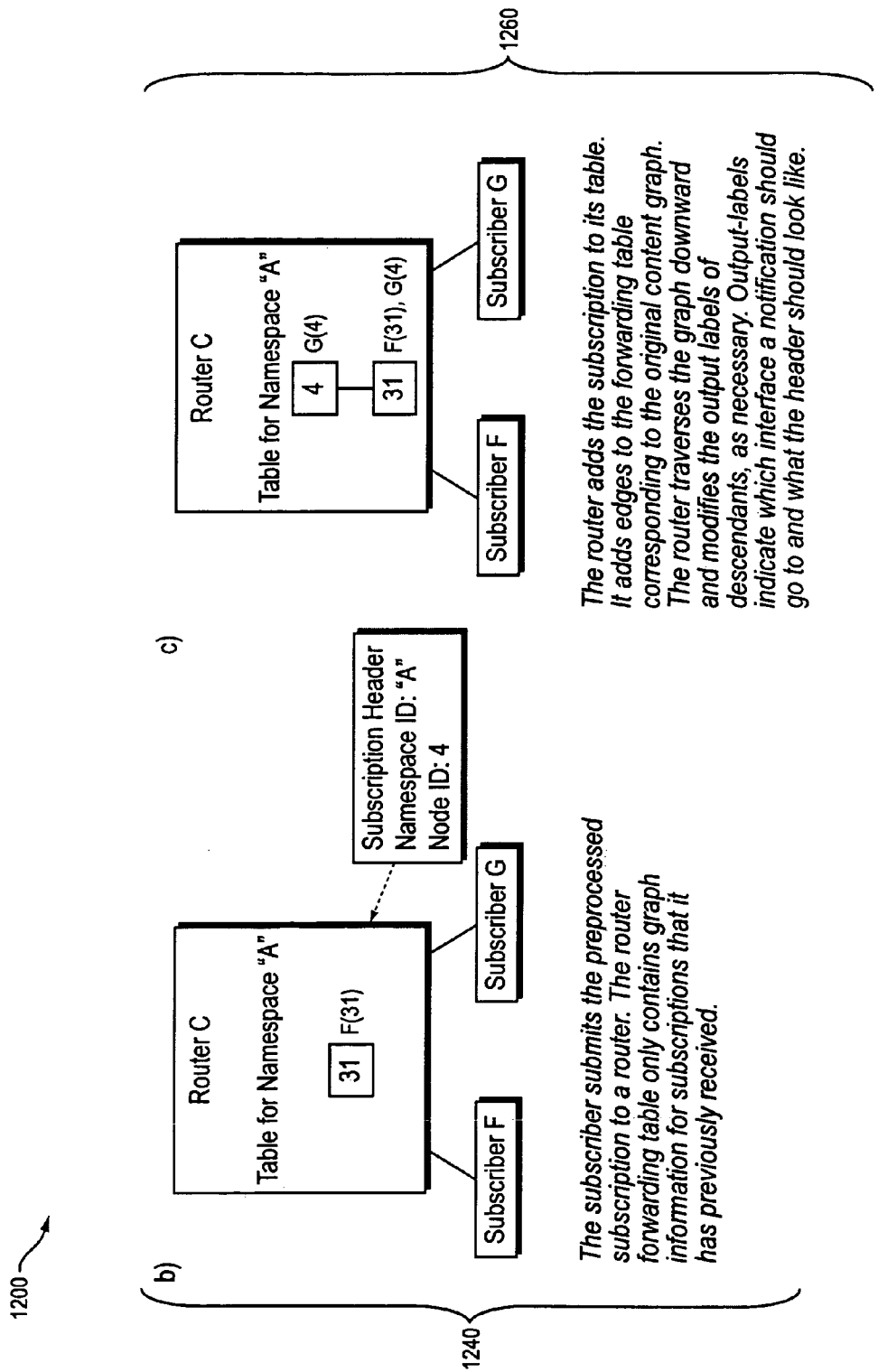
Figure 10I:
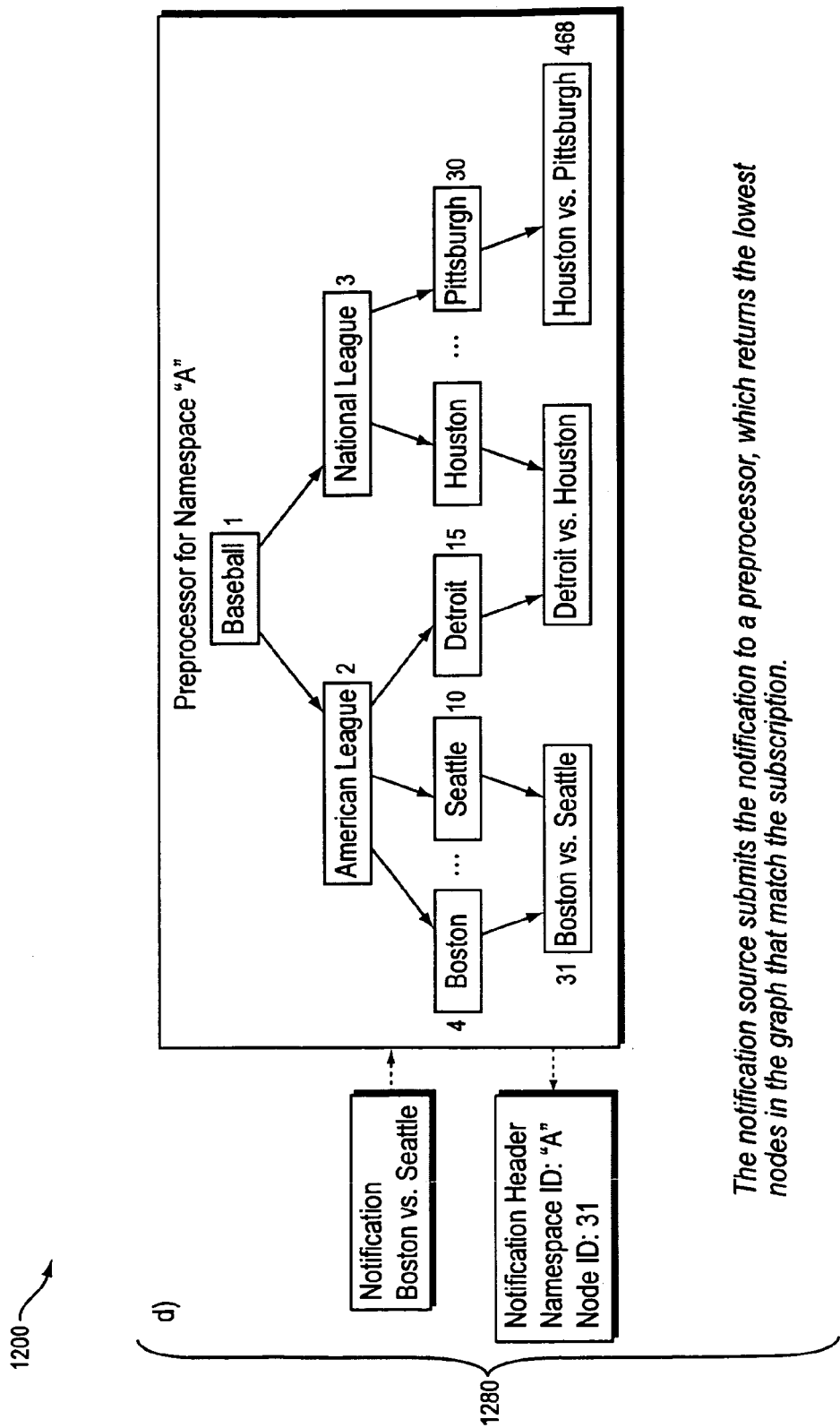
Figure 10J:
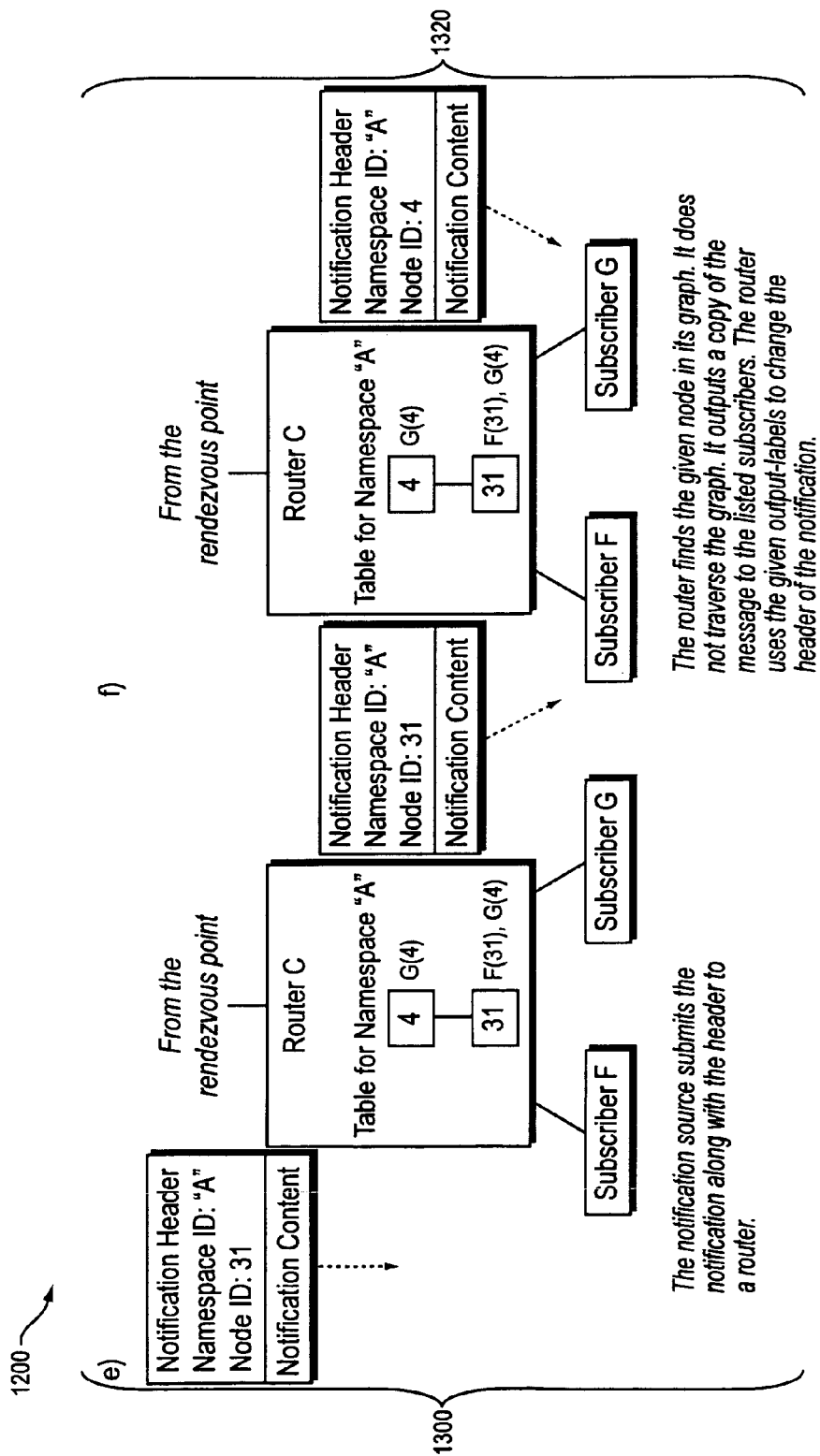

Referring now to FIGS. 10E-10F, shown is an example 1000 illustrating how a graph's output labels change as a series of subscriptions are added to the graph. In element 1020, a content graph of a router with subscription information has one subscription for G for node 31. In 1040, neighbor F subscribes to node 4 causing the router to add a label to node 31. The label indicates that the notification messages matching 31 should be sent to neighbor F marked with node identifier 4. In 1060, F subscribes to node 1. All of node 1's descendant's already have labels for F so that the router does not add any labels to these descendants. In 1100, H subscribes to node 10 causing the router to add node 10 to its graph and update labels for the new node. The router updates the labels for the new node 10 by adding a label for neighbor F with node identifier 1. The router then adds a label to node 10 for H and a label to node 31 indicating that messages matching 31 should be sent to H marked with node identifier 10. In 1120, H subscribes to node 4 and the router adds a label to node 31 indicating that messages matching 31 should be sent to H with a node identifier 4. When the router receives a notification message with node identifier 31, the router will send the message to F, G, and H. Note that the message the router sends to H is marked with two node identifiers, 4 and 10.

Referring now to FIGS. 10G-10J, shown is an example 1200 illustrating how the processing steps described herein for output labels may be used in an embodiment with baseball announcements. Element 1220 illustrates the subscriber submitting a subscription for preprocessing returning a corresponding notification id. In 1240, the router starts with a single subscription from F for node identifier 31. The router receives a second subscription from G for node identifier 4 and, in element 1260, adds an output label for node identifier 4 to its graph. The output label indicates that G should receive notifications for node identifier 4 and the header should be marked with node identifier 4. The router then traverses descendants of the given node. For each descendant, the router checks to see whether an output label for the given subscriber exists and, if not, the router creates the appropriate output label. With reference to 1260, the router adds an output label to node identifier 31 indicating that G should receive copies of this notification marked with node identifier 4. With reference to 1280, a notification message is submitted for preprocessing and then, in element 1300, is sent to the router rendezvous point. When the notification message is received, the router in 1300 and 1320 finds the given node in its content graph. Instead of traversing the output graph, the router examines the output labels annotated on the given node. For each output label, the router creates a copy of the notification, modifies the notification header as indicated by the label, and then forwards a copy of the notification to the specified subscriber.

Figure 10K:
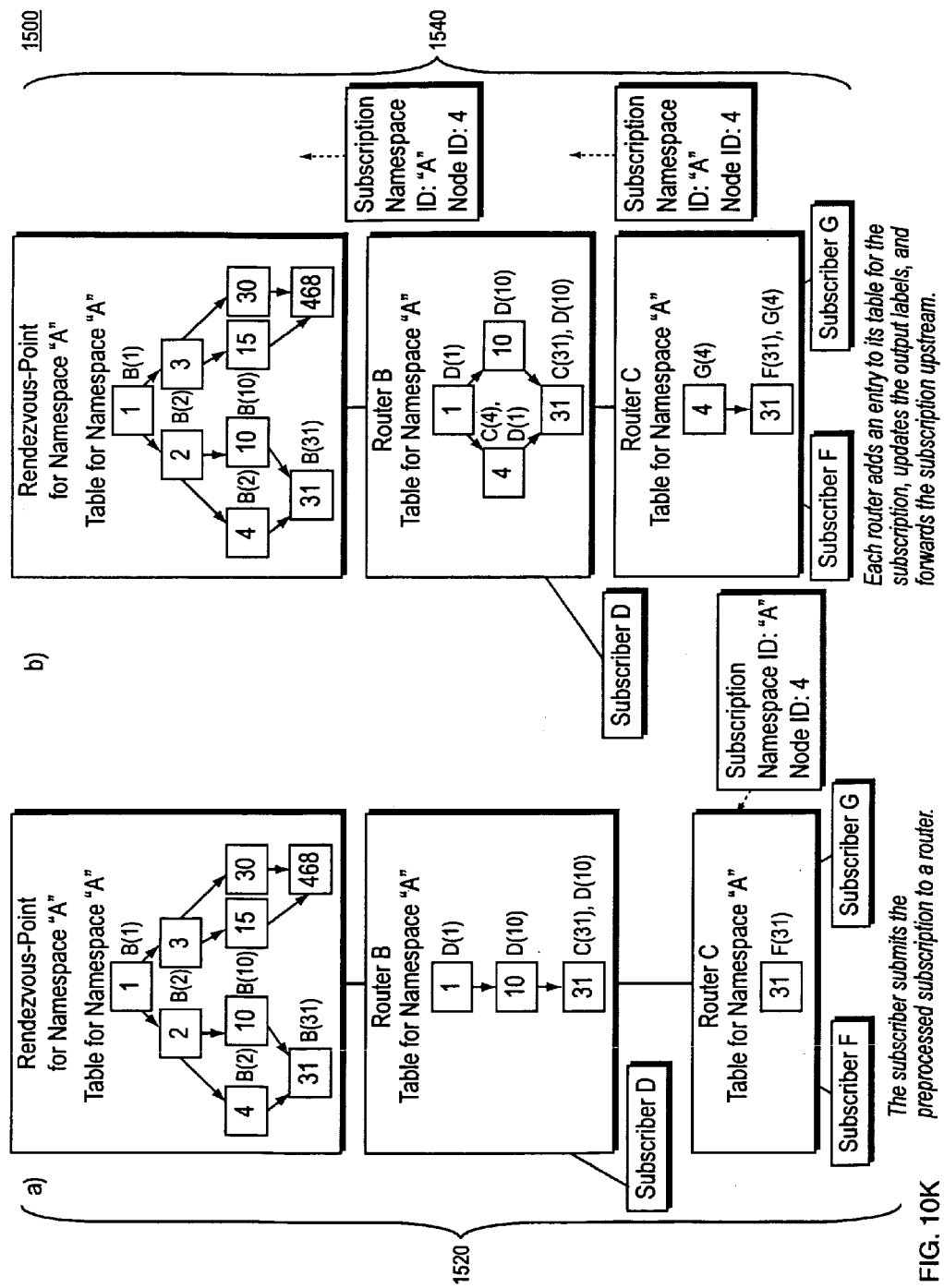
Figure 10L:
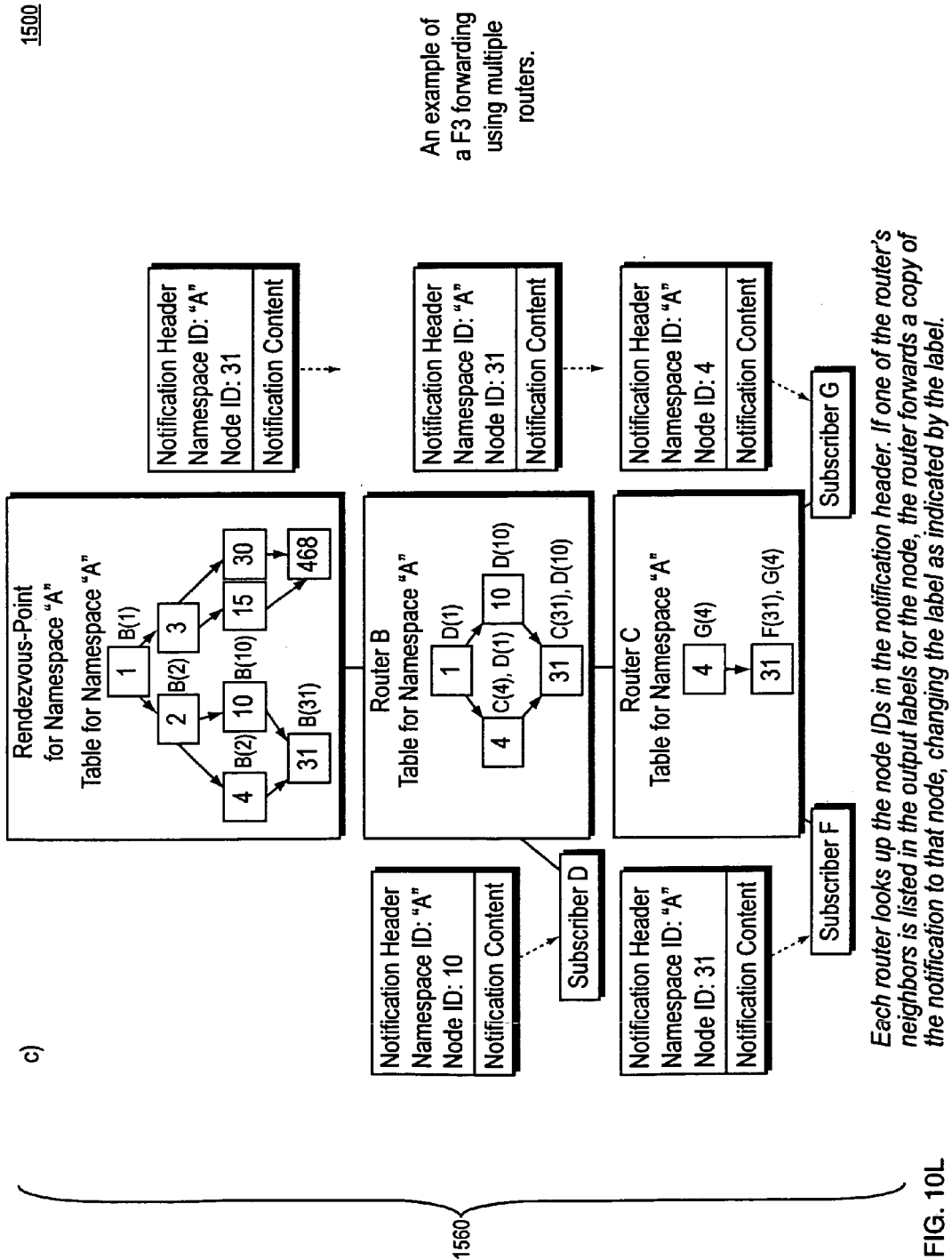

Referring now to FIGS. 10K-10L, shown is another example 1500 using output labels for forwarding with multiple routers. In 1520, the preprocessed subscription is submitted to a router. In 1540, the subscription is propagated upstream toward the rendezvous point. At each level, the router receiving the subscription adds an entry to its table, updates the output labels, and forwards the subscription entry further to the next router. In 1560, a notification message is received at the rendezvous point and propagated downstream through one or more levels of routers. At each level, the router looks up the node identifiers specified in the notification header. If one of the router's neighbors is listed in the output labels for the node, the router forwards a copy of the notification to that node changing the header as indicated by the label.

It should be noted that an embodiment using output labels in forwarding tables may be larger due to the additional information. Subscriptions also may take longer to process due to the output label information determined. However, the longer subscription times are offset by the quicker notification processing time using the previously determined output labels.

It should be noted that rendezvous points as described herein in connection with previous examples maintain a copy of the content graph for a particular name space such as, for example, the baseball categorization example. Content graphs used within an embodiment may be static and complete representations of a subscription topic and change only when, for example, an administrator undertakes to revise the subscription service. As also described herein, an embodiment using the foregoing examples may also store a content graph at a rendezvous point that changes and grows dynamically as subscribers make new requests for subscription topics.

When using the minimal content graphs, processing is performed in an embodiment to provide information to a router when adding a new node to its content graph. In one embodiment, the content graphs at each router and at the rendezvous point may be queried by downstream routers as described herein for additional graph information, such as when a downstream router is adding a new node to its content graph and the routers are using dynamic content graphs.

When a router receives a subscription, a router sends the content graph information for the subscription upstream toward the relevant rendezvous point. The router may additionally request a return of information from an upstream router for edge information in order to add a new node for the subscription if needed. Such a request may be in the form of a query for graph information when adding a new node to a content graph at a router as part of step 362 processing in FIG. 8.

The processing techniques that the routers may use to request and disseminate graph information in an embodiment may be represented in a pseudocode-like fashion in element 620 of FIG. 11. In element 620 of FIG. 11, when a router receives a subscription request for a node that is not already within the router's content graph, processing as indicated by 621 is performed. Within 621, the router adds the node to a list of nodes that are pending or awaiting graph information. The router then forwards the subscription to its upstream neighbor requesting information about the node. If a router receives a subscription that requests graph information from one of its neighbors, and the router also has no information about the node, the router will propagate the request upstream towards the rendezvous point as indicated at 622. Additionally, the router will also make a note with any information received should also be propagated downstream. When a router is ready to send information about a node to one of its neighbors, the processing at 640 may be performed where the router finds the appropriate parent and child nodes for that note of interest and neighbor in the graph. The parent and child of the node are the lowest ancestors of the node to which the neighbor has subscribed. Likewise, the children of the node are the highest descendants of the node to which the neighbor has subscribed. The router then sends graph set-up messages to the neighbor specifying the parents and children of the node. Upon receiving a graph set-up message, processing is indicated by 660 may be performed. Within 660, a router adds the node to its graph with edges to the specified parents and children. Finally, the router adds any pending subscriptions to the node using the subscription list as illustrated in connection with other data structures described herein.

Figure 12A:
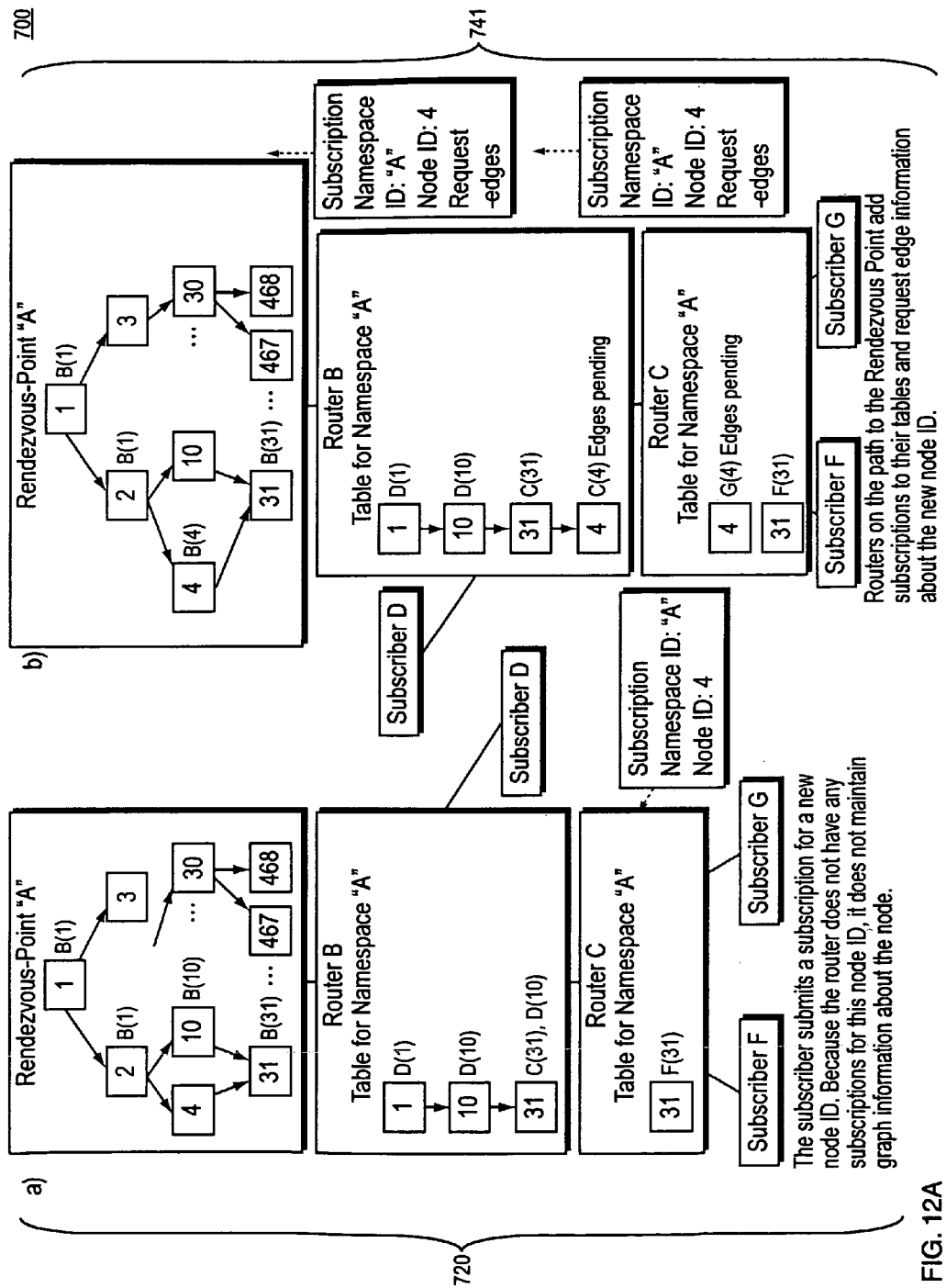
FIGS. 12A-12B are illustrations of the techniques of FIG. 11.
Figure 12B:
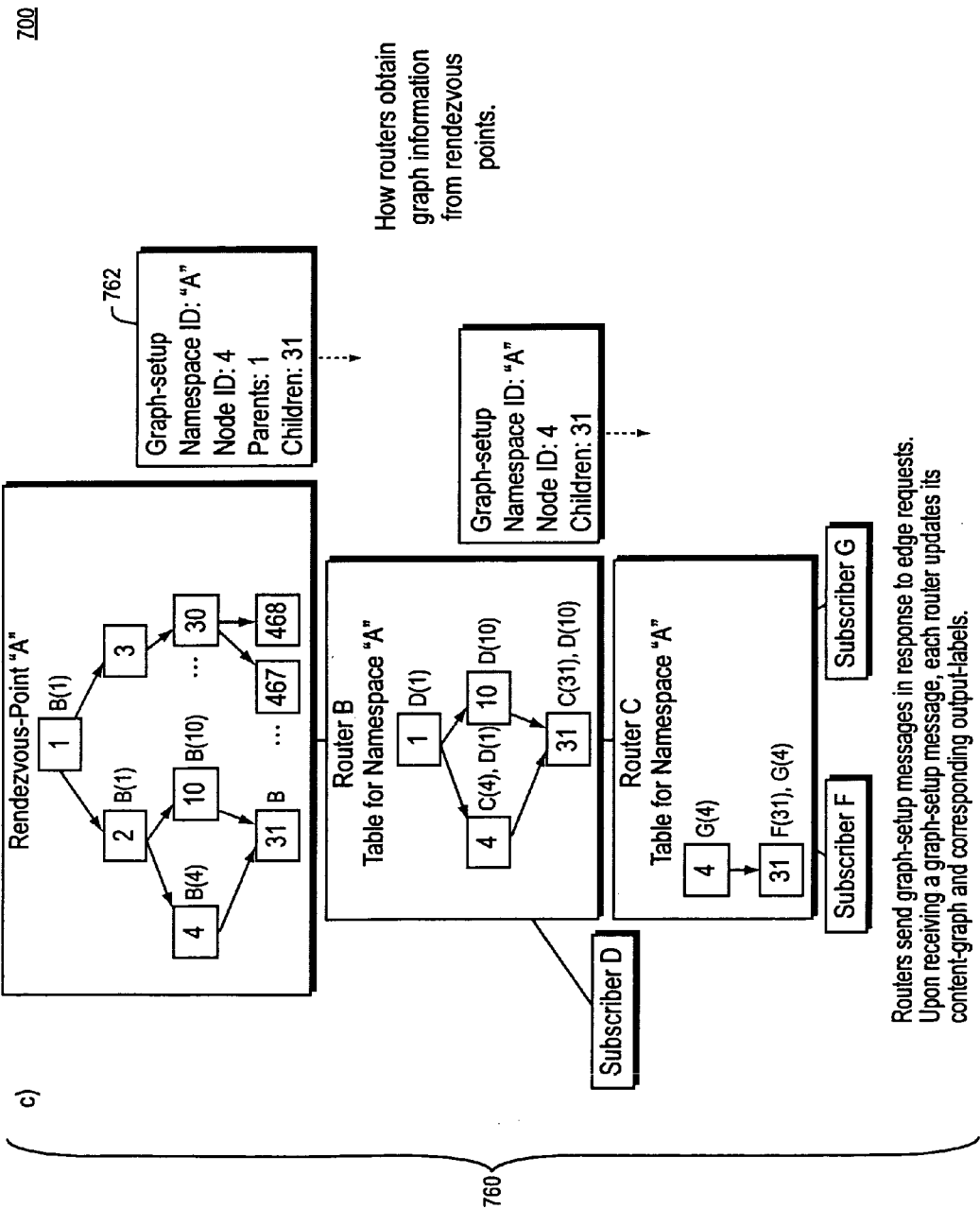

Referring now to FIGS. 12A-12B, shown is an illustration of the processing described herein in connection with graph setup information and propagating information about a content graph between various routers when a partial content graph is used in an embodiment without output labels. Referring to element 720, subscriber G submits a subscription for node identifier 4 to router C. Currently, router C does not have any information regarding node 4 since router C currently has no subscriptions for node 4. Accordingly, referring to illustration 740, router C adds a node for node identifier 4 to the graph with edges pending. In other words, router C will connect the newly added node for 4 to the appropriate other nodes within its graph upon receipt of additional graph information. The subscription for node identifier 4 is propagated from router C to router B up the tree towards the rendezvous point. Similarly, router B adds a node to its graph for node identifier 4 and further propagates the request up to the rendezvous point A. Referring to 760, the rendezvous point A determines the child and parent nodes for the particular node identifier 4 in this example as indicated by 762. The rendezvous point A then propagates this information regarding the particular parent and child nodes for the requested node identifier 4 downstream to the one or more routers requiring the additional graph information in order to connect node identifier 4 to other elements in the graph maintained by each router. It should be noted that using the pseudocode representations described in FIG. 11, the parent and child identifiers returned from the rendezvous point downstream to a router includes parent and child identifiers with respect to the graph as maintained by the receiving router (which is router B in this example). For example, node identifier 4 with respect to the graph as maintained by rendezvous point A has a parent node identifier 2 and a child node identifier 31. However, with respect to the content graph as maintained by router B, the parent for node 4 is 1, and the child is node 31. Note that the parent node and child node identifiers are with respect to the requested node identifier of the receiving router.

An embodiment may use other techniques for communicating graph information to routers using the minimal content graph. For example, an embodiment may have each router query a service, such as using an API (Application Programming Interface), to obtain graph information. The service may be provided by, for example, the rendezvous point, the preprocessor, or another component such as a database.

Figure 13:
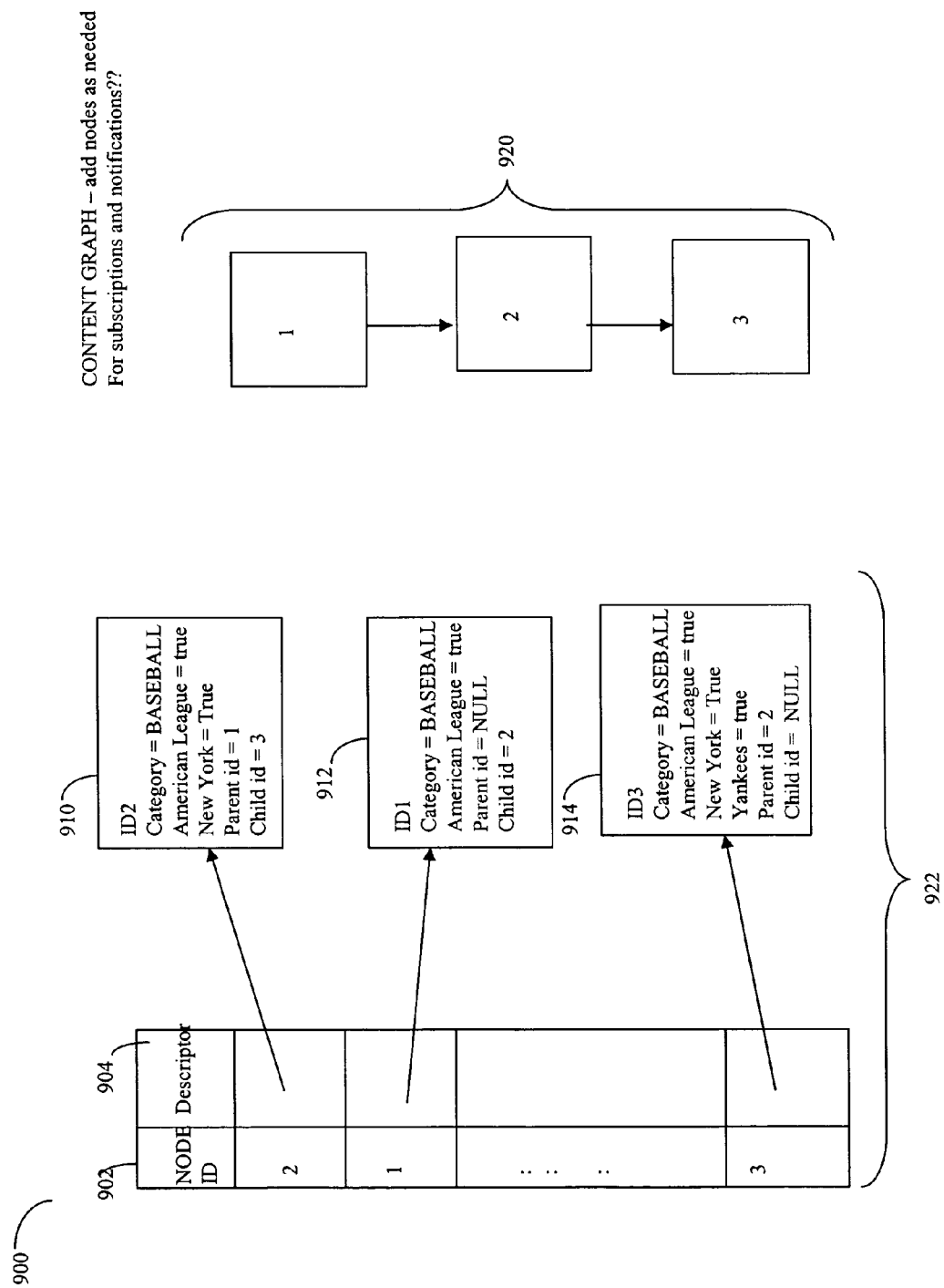
FIG. 13 is an example representation of a content graph used in an embodiment of a preprocessor.

Referring now to FIG. 13, shown is a representation 900 of a content graph as may be maintained by a preprocessor in an embodiment described herein. The illustration 900 utilizes a data structure representation similar to that described in connection with FIG. 10C and additionally includes the attribute and value information for each node used by the preprocessor in order to determine a corresponding node identifier for incoming messages. The data structure representation 900 of FIG. 13 shows more detail of how an embodiment may store information represented for use by a preprocessor such as, for example, the information in the graph of element 411 of FIG. 9A. Element 920 is a logical view in digraph form of the information represented by portion 922. In one embodiment, nodes may be added to the content graph as subscription and notification messages of new types are received by the preprocessor.

An embodiment of the subscription system may also use periodic resubscription and subscription acknowledgement to ensure consistency of state information as included in all of the routers. In one embodiment, the subscriber or router that maintains subscriptions for a particular rendezvous point may periodically send a resubscription message upstream toward the rendezvous point as illustrated in 960 of FIG. 14. The resubscription message identifies the nodes in the graph for which a router maintains an active subscription. When an upstream router receives a resubscription message from a neighbor, the upstream router examines the nodes in its current content graph for the neighbor corresponding to the node identifiers included in the received resubscription message. The router then updates the resubscription time stamps for that neighbor as included in the node descriptors corresponding to the node identifiers in the resubscription message. If a router does not receive a resubscription message within a certain time period, the router assumes that the subscription has been dropped.

Figure 14:
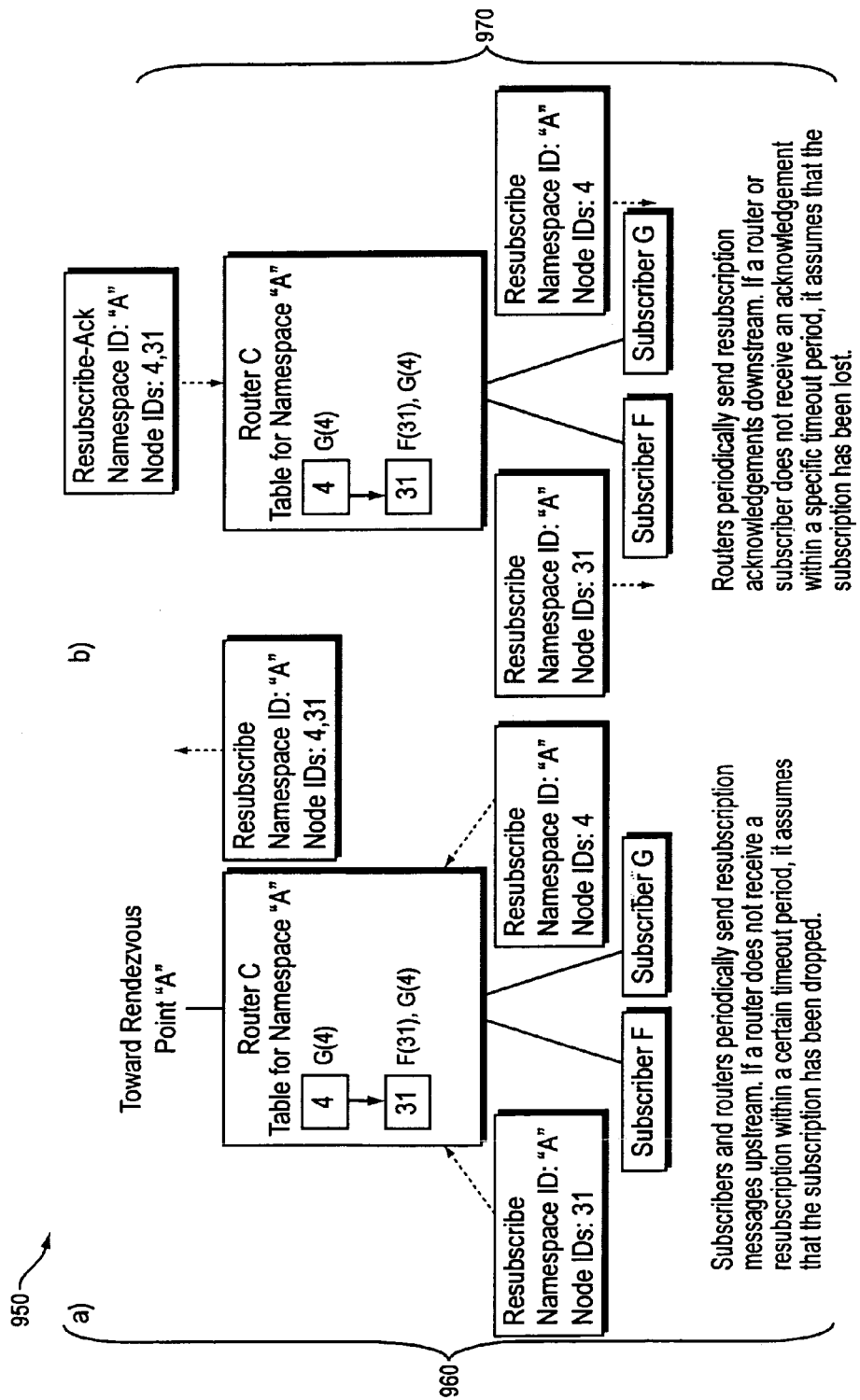
FIG. 14 is an example illustrating resubscription.

Routers may also send periodic resubscription acknowledgement messages downstream as illustrated in 970 of FIG. 14. If a router maintains an active subscription for a downstream neighbor, it will send a resubscription acknowledgement message to that neighbor. This will identify all the nodes in the router's graph for which the neighbor currently holds a subscription. When the downstream neighbor receives one of these messages, the downstream neighbor examines the nodes within its content graph corresponding to the message identifier and accordingly updates a resubscription acknowledgement time stamp.

The resubscription acknowledge time stamp and the resubscription time stamp(s) maintained for each subscriber may be included within a node descriptor for each node identifier in a content graph, such as element 304 of FIG. 10C. Referring back to FIG. 10C, element 304 may optionally include a timestamp value for each subscriber to be used in connection with resubscription messages sent upstream. Element 304 may also optionally include a timestamp value for use in connection with resubscription acknowledgement processing.

It should be noted that the frequency with which messages are sent in connection with resubscriptions as described above may vary in accordance with each embodiment.

Figure 15:
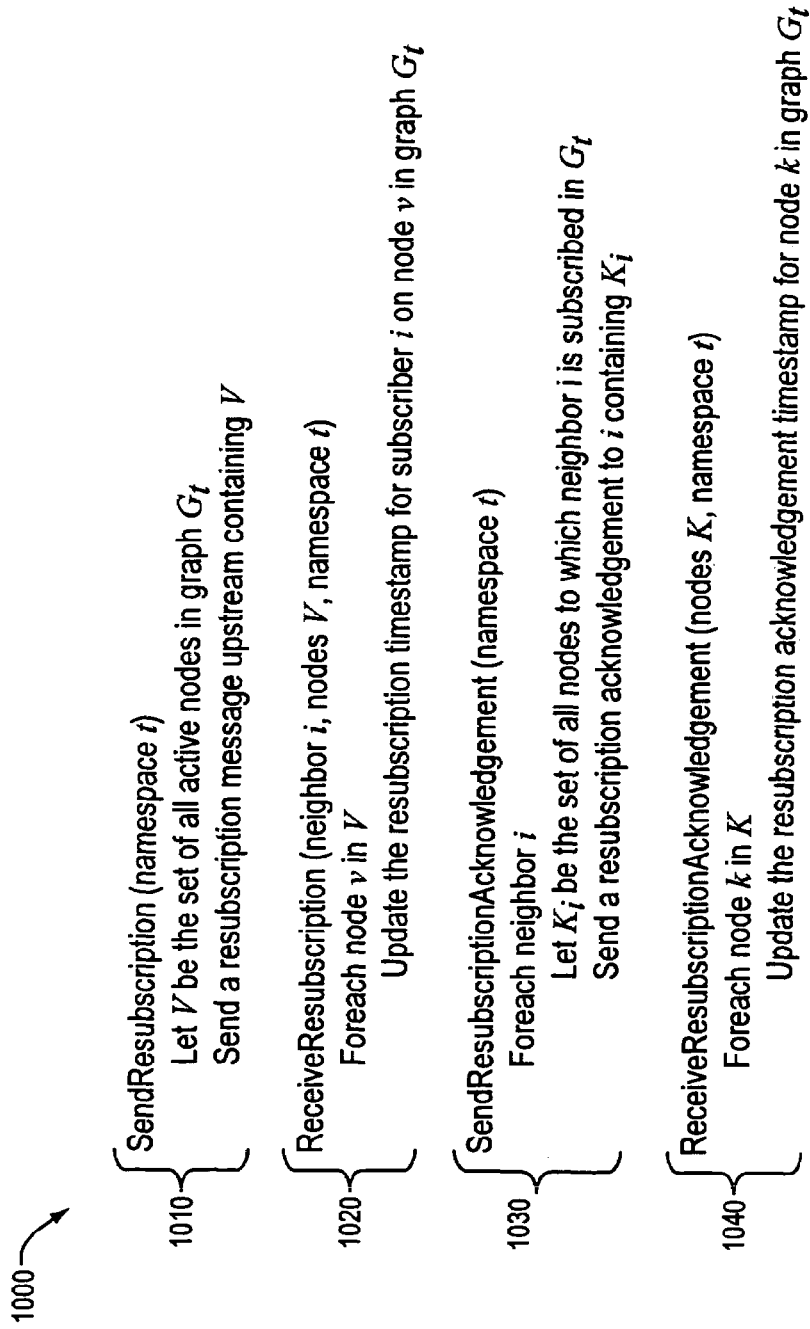
FIG. 15 is an example representation of pseudocode for an embodiment of resubscription processing.

Referring now to FIG. 15, shown is an example of a pseudocode representation of processing that may be performed in connection with resubscription. Elements 1010 and 1020 describe the processing steps that may be performed in an embodiment in connection with, respectively, sending and receiving resubscription messages as described above. Element 1030 describes the processing that may be performed in connection with sending a resubscription acknowledgement. Element 1040 describes processing in connection with receiving a resubscription acknowledgement message.

Routers may also periodically check their content graph to determine whether any subscriptions have expired. The particular frequency with which routers perform this check of their content graphs and send resubscription messages may vary in accordance with each embodiment.

Referring now to FIG. 16, shown is a pseudocode representation of one embodiment of processing steps in 1050 that may be performed by a router to periodically check for expired subscriptions. For each node within the router's content graph, each router checks to see whether a downstream subscriber has sent a resubscription message recently within a predetermined time period. If a neighbor has not sent a resubscription message recently (as within a predetermined time period that may vary in each embodiment), the router considers the subscription to be interrupted. The router may also check each node in the graph to see whether an upstream neighbor has sent a resubscription acknowledgement message recently. If the router has not received an acknowledgement recently within a predetermined time period, the router will consider the subscription to be interrupted. In one embodiment, if the subscription system is unable to recover what it has determined at a router as an interrupted subscription, the router will drop the subscription.

To remove a subscription in one embodiment, an unsubscription message may be submitted to the same router used to create a previous subscription.

Figure 17:
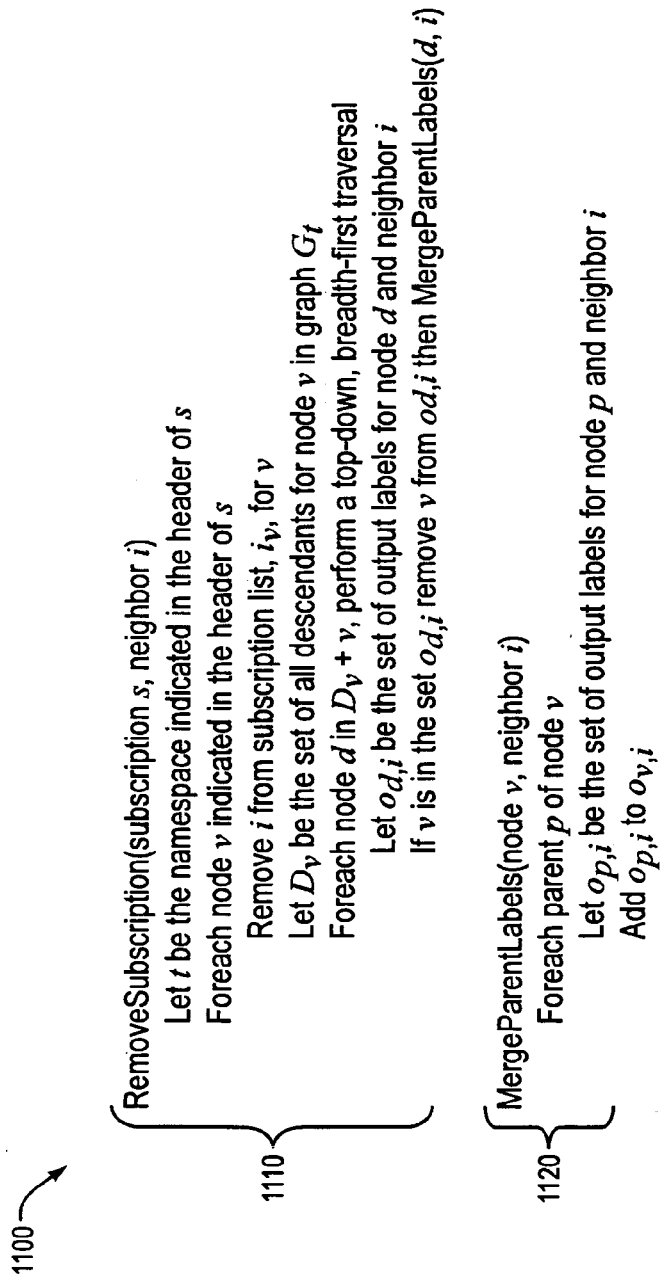
FIG. 17 is an example representation of pseudocode for an embodiment of unsubscription processing.

Referring now to FIG. 17, shown is an example of a pseudocode representation 1100 of processing steps that may be performed in connection with removing a subscription. Each unsubscription message in this embodiment includes the same node identifier specified in the original subscription message. In element 1110, when a router receives an unsubscription message, the router locates in its content graph the nodes specified in the unsubscription message received and accordingly removes the subscription from those nodes. The router also fixes the labels for these nodes and the nodes of any descendants as required. If the router determines that any nodes located in the unsubscription message have no more subscribers, the router marks the node for removal from its content graph. The router also sends an unsubscription message identifying these nodes to its upstream neighbor and the upstream neighbor continues and performs the same processing steps.

Figure 18:
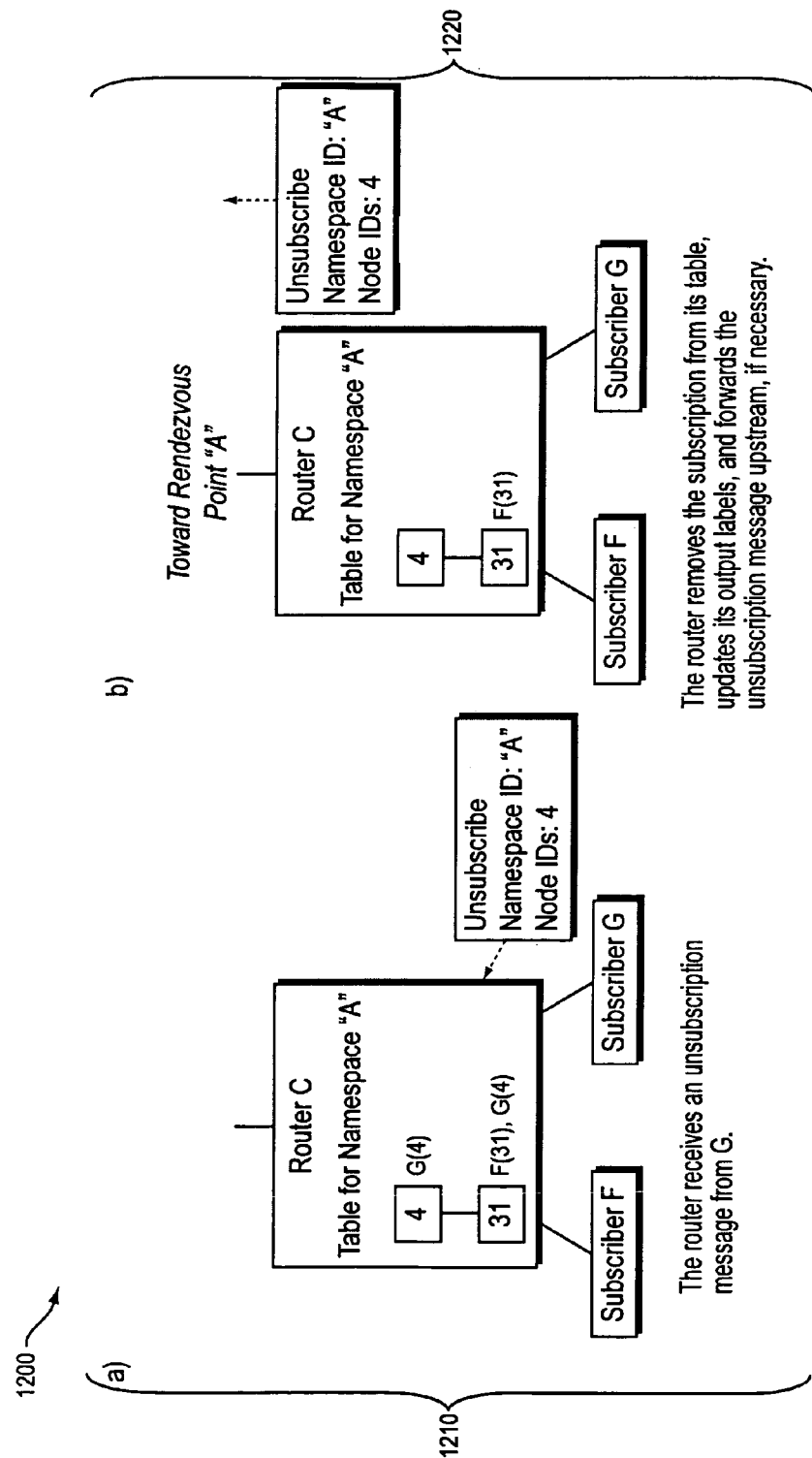
FIG. 18 is an example illustrating the processing of FIG. 17.

Referring now to FIG. 18, shown is an example 1200 illustrating an unsubscription message process. In 1210, a router receives an unsubscription message from a subscriber G. Illustrated in 1220 is the router removing the subscription from its tables, updating corresponding output labels, and further forwarding the unsubscription message upstream as required in accordance with the previously described processing steps.

An embodiment of a subscription system described herein may use a technique in connection with detection of lost messages using sequence numbers. Loss detection may be used, for example, by a subscriber to ensure that they have not missed any notification messages.

Figure 19:
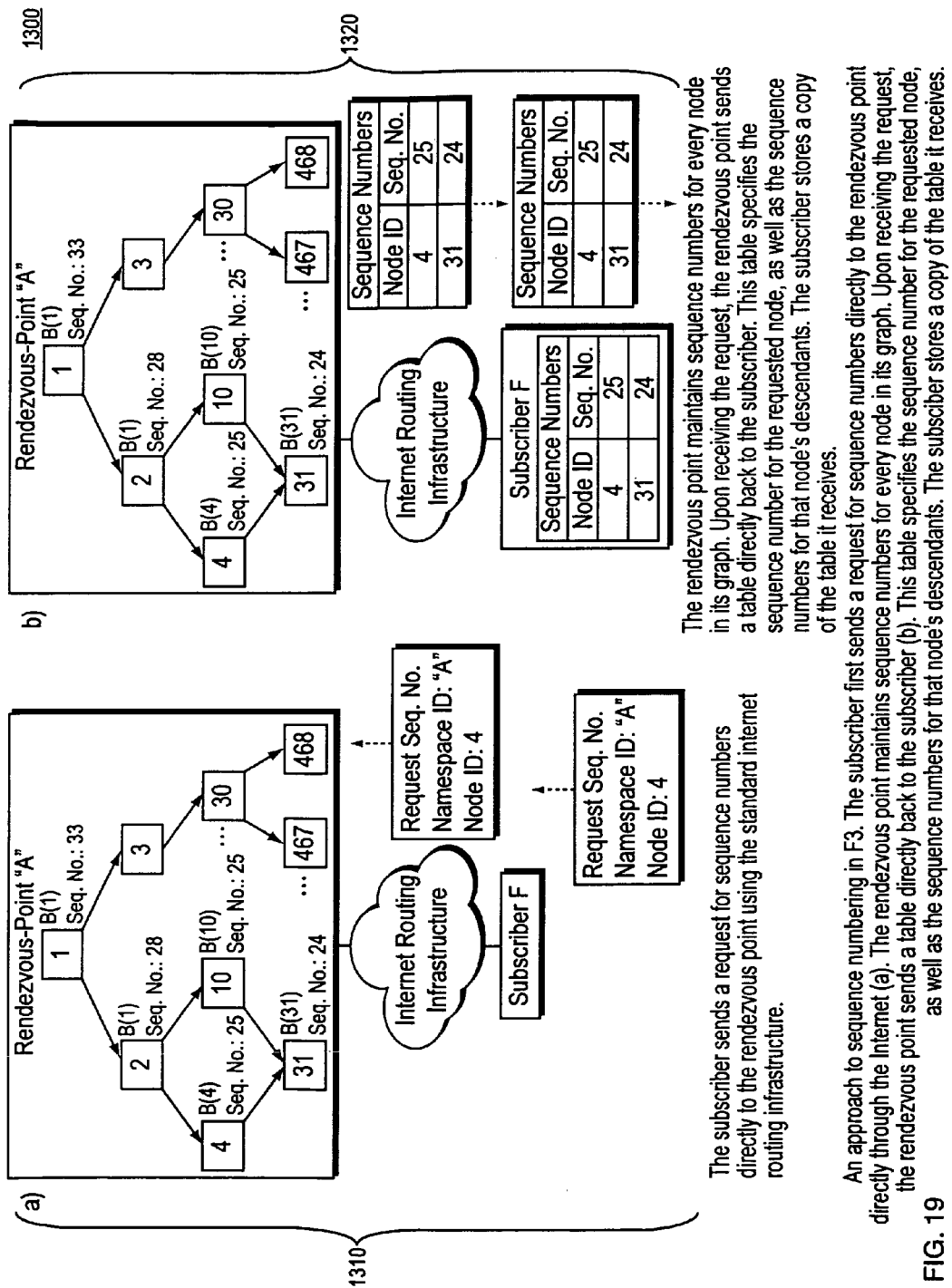

Referring now to FIG. 19, shown is an illustration 1300 using sequence numbering in a subscription system for loss detection. Prior to receiving any subscriptions, the rendezvous point as illustrated in 1310 and 1320 annotates each node in its content graph with sequence numbers. Before a subscriber submits a subscription, the subscriber in 1310 first sends a message to the rendezvous point identifying the node identifier for that particular subscription as illustrated in 1310. The rendezvous point then sends back a message as illustrated in 1320 listing the sequence number for the nod identifier as well as the sequence numbers for all of that particular node's ancestors. In this example, the node identifier is 4 and the table returned as illustrated in 1320 includes information on node identifier 4 and its ancestor 31.

Referring now to FIG. 20, shown is an illustration 1350 of how a subscriber may use sequence numbers in an embodiment for loss detection. As illustrated in 1360, a subscription message is submitted as described elsewhere herein to a router. The subscription message is then forwarded upstream. At a later point in time, the rendezvous point, as illustrated in 1370, receives a notification message. The rendezvous point finds the lowest node in its graph matching the message. The rendezvous point router then increments the sequence number on the relevant nodes in accordance with the notification message received. The router then attaches a sequence number header to the message listing the node identifiers and corresponding sequence numbers. Finally, the router attaches a standard notification header onto the notification message as described elsewhere herein. As illustrated in 1370, the rendezvous point then forwards the notification message to appropriate subscribers. The routers within the subscription system read the headers in order to forward notification messages further onto other routers but do not read the sequence number header information. Upon receiving a notification, each subscriber removes the subscription system header information and reads the sequence number header information also included in the message. The subscriber may then check the sequence number for the given node identifier against its local table. If the subscriber detects a break in the sequence numbers for a given identifier, the subscriber marks the message as lost and may attempt to recover the message. Otherwise, if no message has been lost, the subscriber updates the sequence numbers in its local table in accordance with the next element in the sequence for the particular node identifier.

In connection with the techniques described herein, the end to end loss detection technique described above may be used by a subscriber for loss detection. The routers and subscription system described herein in this embodiment do not participate in detection of message losses or recovery from these losses. However, other embodiments may include such functionality in connection with message loss recovery.

Figure 21:
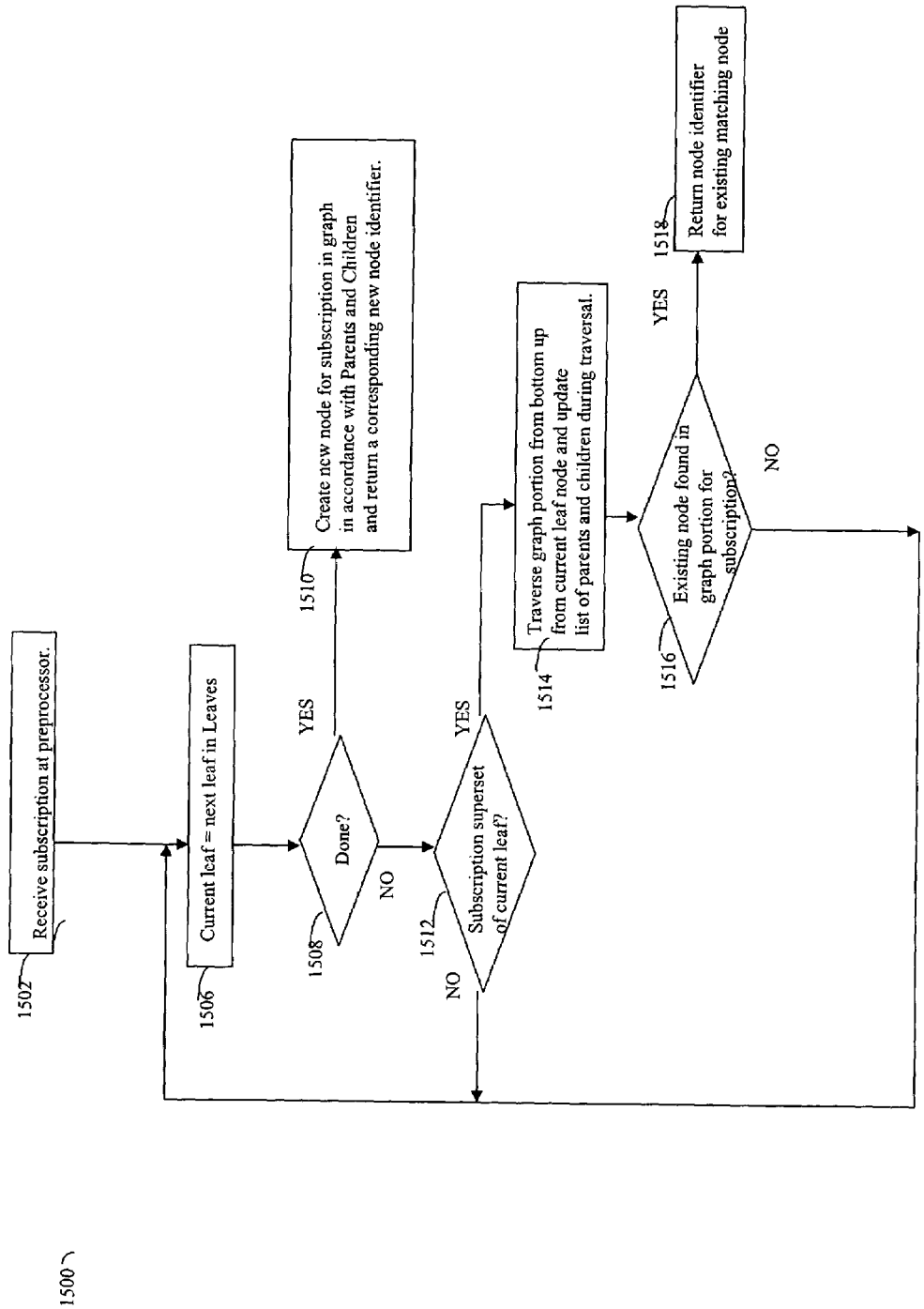
FIG. 21 is a flowchart of more detailed processing steps of subscription preprocessing.

Referring now to FIG. 21, shown is a flowchart of processing steps that may be performed in an embodiment by a dynamic preprocessor described herein in connection with preprocessing subscriptions messages. In this flowchart 1500, the preprocessor uses a content graph to which nodes are dynamically added in accordance with subscription requests received. The general approach described in 1500 is to traverse the existing content graph from the bottom (leaf nodes, most specific information) to the top (root node, most general). In this traversal, an attempt is made to determine if there is an existing node in the graph for a current subscription request submitted for preprocessing. If so, this node's identifier is returned. Otherwise, a new node is added to the graph in the appropriate location (e.g., with the appropriate parent(s) and child(ren) node(s) based on the categorization of the subscription).

At step 1502, a subscription request is received by the preprocessor. In this example, the variable Parents and Children represent the set of node identifiers which have been respectively determined to be the parent and children of the current subscription request. At step 1506, current leaf is set to the next leaf node. In this example, a list of all leaves in the content graph exists and is used in processing of 1500. The step 1506 forming the top of a loop illustrated in 1500 iterates through all the leaves in the graph and performs an upward traversal of connecting nodes. At step 1508, a determination is made as to whether all leaves in the graph have been processed. If not, control proceeds to step 1512 where a determination is made as to whether the subscription's category is a superset of the current leaf. If not, control proceeds to step 1506 to continue processing with the next leaf. Otherwise, control proceeds to step 1514 to traverse the portion of the graph from the current leaf node from the bottom up. During this traversal, other existing nodes visited may be determined to be the parent(s) and child(ren) for the current subscription. An embodiment, as described in more detail in following paragraphs, may store these existing nodes in appropriate parent and child lists for use in later processing steps. At step 1516, a determination is made as to whether any existing node in the current traversal matches the existing subscription. If so, the traversal processing for the current leaf stops and the matching node identifier is returned at step 1518. Otherwise, control proceeds to step 1512 to continue traversal of the remaining graph portions from the bottom up in accordance with the Leaves.

Processing of the loop illustrated with the first step 1506 continues as long as no existing node has been determined as a match for the current subscription. Step 1508 will evaluate to yes if the entire content graph is traversed and no existing node match determined. At this point, control proceeds to step 1510 where a new node is created for the current subscription received at step 1502. This new node is inserted into the graph in accordance with the Parents and Children determined during the graph traversal.

In one embodiment, determination of any parent and children nodes for the current subscription may be performed by recursively determining if the subscription is a superset of a current node (beginning with a leaf node) and, if so, obtaining any parent and child nodes of this current node. If the current node has no parents, the current node is determined to be a child of the subscription. If the current node is not a superset of the subscription, then the current node is added as a parent node of the subscription. Other embodiments may use other techniques in connection with determining graph information of where to insert a new node for the current subscription when using dynamic content graphs in the preprocessor.

Figure 22:
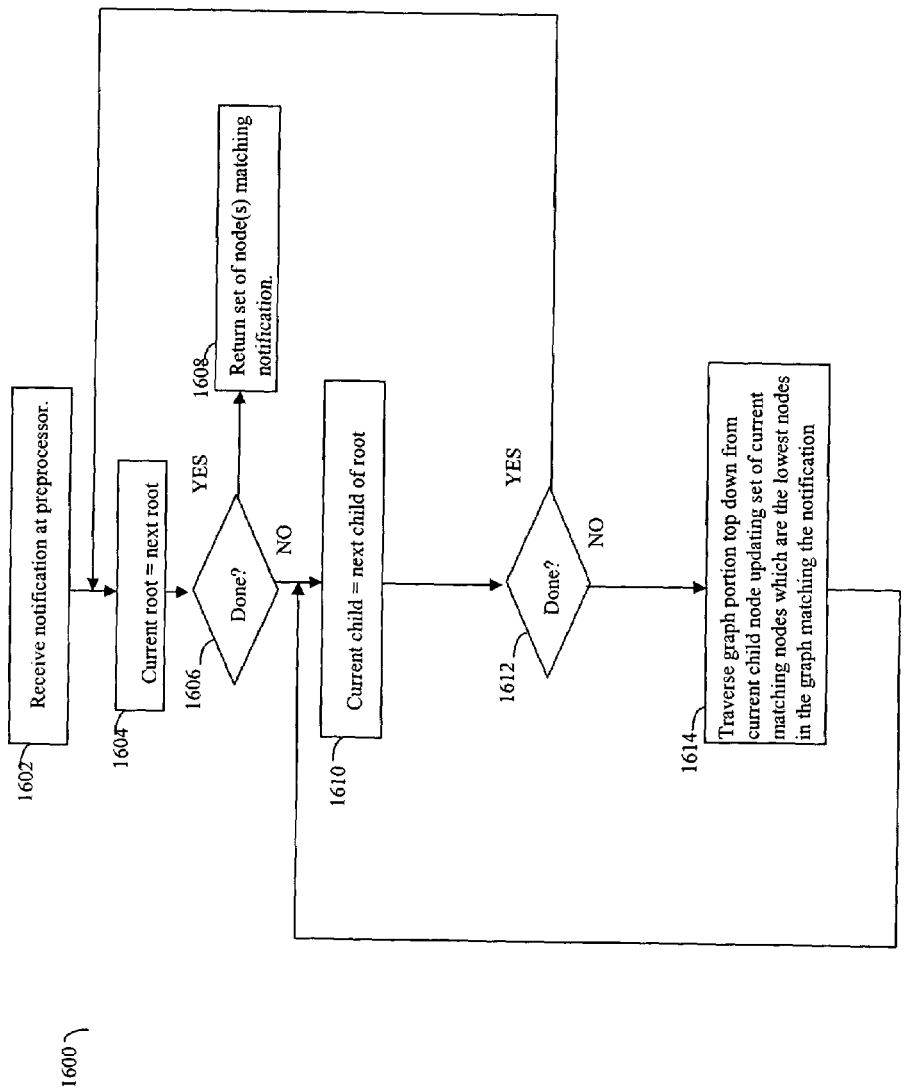
FIG. 22 is a flowchart of more detailed processing steps of notification preprocessing.

Referring now to FIG. 22, shown is a flowchart 1600 of processing steps that may be performed in an embodiment by a preprocessor in connection with preprocessing a notification message. The approach described in 1600 is a top down traversal of the content graph from each of the one or more roots to determine the lowest nodes in the graph that match the notification. At step 1602, a notification message is received by the preprocessor. At step 1604, the current root is assigned the next root in the graph. A determination is made as step 1606 as to whether the content graph traversal has been completed as may be determined when all paths leading downward from all roots have been traversed. If so, control proceeds to step 1608 to return the list of matching nodes found during the traversal. Otherwise, control proceeds to step 1610 where the top down traversal proceeds from each child of the current root. At step 1612, a determination is made as to whether portions of the graph from all children of the current root have been traversed. If so, control proceeds to step 1604 to continue processing with any remaining roots. Otherwise, control proceeds to step 1614 where a traversal is made of the graph portion in a top down fashion from the current child node updating set of current matching nodes which are the lowest nodes in the graph matching the notification during the top down traversal. Control proceeds to step 1610 with the remaining children of the current root. In one embodiment, the top down traversal may be performed recursively.

Below is a pseudocode representation of processing that may be performed in an embodiment in connection with preprocessing subscriptions and notifications in accordance with the general steps of flowcharts of FIGS. 20 and 21.

```
PreprocessSubscription(subscripton s, graph G)
// Given a subscription s and a graph G,
// inserts the subscription s into the graph, if
// necessary. Returns the nodeid in graph G
// corresponding to the subscription.
    Let V be a table for keeping track of which nodes we have visited.
    Let F be a table of results for nodes we have visited.
    Let L be the set of leaf nodes for graph G.
    Let C be an empty set of child nodes for subscription s.
    Let P be an empty set of parent nodes for subscripton s.
    For each leaf l in L
            If subscription s is a superset of the subscription on node l:
                Set the result for node l in the table F as "Superset".
                node n = GetParentsAndChildren(l, s, V, F, G, C, P)
                If n is not nil, then return the nodeid for n.
    Create a new node n with a new, unique nodeid.
    Set n's subscription to be s.
    Set n's parents to be P.
    Set n's children to be C.
    Insert n into graph G.
    Return the nodeid for n.
GetParentsAndChildren(node n, subscription s, visited V, results F,
graph G,
children C,
parents P)
// Recursively traverse the graph from the bottom up
// to find the parents and children of the subscription s
// in graph G.
    Check to see whether node n is marked as visited in table V.
    If node n has been visited, do nothing and return.
    If node has not been visited, mark the node n as visited in V.
    If the subscription s is equal to the subscription
    stored on node n:
            Set the result for n in table R as "Equal".
            Return node n.
    If node n has no parents:
        Add node n to child set C
        Return nil
    Let all_parents_supersets be true
    Foreach parent p of node n:
        If the result for node p in table F is "Superset" OR
        If subscription s is a superset of node p's subscription:
            Set the result for node p in table F as "Superset".
                m = GetParentsAndChildren(p, s, V, F, G, C, P)
                If m is not nil, return m
        else
            Set all_parents_supersets to be false
            Add node p to parent set P
```

```
                    -continued

If all_parents_supersets is false
            Add node n to child set C
        Return nil.
PreprocessNotification(notification t, graph G)
// Given a notification t and a graph G, find the
// lowest nodes in the graph that match t.
    Let V be a table for keeping track of which nodes we have visited.
    Let R be the set of root nodes for graph G.
    Let F be a table of results for nodes we have visited.
    Let N be an empty set of nodeids.
    Foreach root r in R
        If the notification n matches the subscription stored
        on node r:
            Set the result for r in table F as "Matches"
            MatchNotification(r, t, V, F, G, N)
    Return set N
MatchNotification(node n, notification t, visited V, results F, graph G,
nodeids N)
// Recursively traverse the graph from the top-down
// to find the lowest nodes in the graph that match
// the notification.
    Check to see whether node n is marked as visited in table V.
    If node n has been visited, do nothing and return.
    If node has not been visited, mark the node n as visited in V.
    Set no_children_match to true.
    Foreach child node c of node n
        Let s be the subscription on node c.
            If the result for c in table F is "Matches" OR
                If the notification matches the subscription on node c
                    Set the result for node c in table F as "Matches"
                    Set no_children_match to false.
                    MatchNotification(p, t, V, F, G, N).
    If no_children_match is true
        Add the nodeid for n to set N.
    Return.
AttributeValueSubscriptionIsSuperset(subscription s1, subscription s2)
// Given two attribute-value subscriptions,
// return true if subscription 1 matches a superset of subscription 2
    Let A1 be the set of attributes for subscription s1.
    Let A2 be the set of attributes for subscription s2.
    If set A1 is not a subset of A2 then return false.
    Foreach attribute a in set A1
        Let v1 be the value associated with a in subscription s1
        Let v2 be the value associated with a in subscription s2
        If the value v1 is not a superset of the value v2, then return
        false.
    Return true.
AttributeValueSubscriptionIsSubset(subscription s1, subscription s2)
// Given two attribute-value subscriptions,
// returns true if subscription 1 matches a subset of a subscription 2
    Return AttributeValueSubscriptionIsSuperset(s2, s1)
AttributeValueSubscriptionIsEqual(subscription S1, subscription s2)
// Given two attribute-value subscriptions,
// returns true if the two subscriptions match exactly the same
// notifications.
    Let A1 be the set of attributes for subscription s1.
    Let A2 be the set of attributes for subscription s2.
    If set A1 is not equal to set A2 then return false.
    Foreach attribute a in set A1
        Let v1 be the value associated with a in subscription s1
        Let v2 be the value associated with a in subscription s2
        If the value v1 is not equal to the value v2, then return
        false.
    Return true.
AttributeValueNotificationMatchesSubscription(notification n,
subscription s)
// Given an attribute-value notification and an attribute-value
// notification, returns true of the notification matches
// the subscription.
    Let AN be the set of attributes for notification n.
    Let AS be the set of attributes for subscription s.
    If set AS is not a subset of AN, then return false.
    Foreach attribute a in set AS
        Let vn be the value associated with a in notification n
        Let vs be the value associated with a in subscription s
        If the value vs is not a superset of the value vn, then return
        false.
    Return true.
```

The foregoing techniques and subscription system may be used in a wide variety of difference applications in addition to the examples described above. The foregoing may be used in an inventory tracking system in which suppliers, for example, may submit subscriptions specifying criteria used to track inventory in a warehouse. As changes are made to the inventory, notifications may be sent to suppliers. The inventory tracking may be performed using RFID-tagged items. In another application, the foregoing techniques may be used in connection with searching services. In a continual search service, subscribers request to be updated when an item matching specified criteria is located. For example, an auction site, such as Ebay, may use the foregoing techniques to create a subscription system providing notification to their customers. Subscribers may sign up for notification when an item matching their needs was put up at auction. In another example application, the foregoing techniques may be used to disseminate database updates in accordance with particular criteria.

It should be noted that an embodiment may implement the foregoing techniques using any one or more different programming languages. In one embodiment, for example, the router software of the subscription system may be implemented using C++ on a standard PC running the Linux operating environment. The subscription system described herein may include a preprocessor also written in the C++ programming language executing on a single processor separate from the processors executing the router functionality described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing messages in a subscription system comprising:
    preprocessing a message using a content graph to produce a preprocessed message including an identifier in accordance with said message; and
    submitting said preprocessed message to a server for processing wherein said server performs at least one action in accordance with said identifier included in said preprocessed message, wherein said message is a subscription message and said preprocessed message includes an identifier matching said subscription message, and
    wherein said server includes a plurality of routers in a hierarchical arrangement, and the method further comprises:
    receiving said preprocessed message at a router of the plurality of routers;
    storing, at said router, information in a content graph of said router, the information including information about a subscription in accordance with said preprocessed message; and
    forwarding said preprocessed message to one or more upstream routers of the plurality of routers at a higher level in said hierarchical arrangement than said router in accordance with a forwarding table of said router.

2. The method of claim 1, further comprising:
    adding a node to said content graph of said router if there are no nodes in said content graph corresponding to said subscription.

3. The method of claim 2, wherein said router communicates with another upstream router to obtain graph information about where to add said node to said content graph.

4. The method of claim 2, wherein said router communicates with said preprocessor to obtain graph information about where to add said node to said content graph.

5. The method of claim 1, wherein each router in said hierarchical arrangement includes a content graph of said each router including information about preprocessed subscription messages received from a subscriber and other routers connected to said each router in said hierarchical arrangement.

6. The method of claim 1, wherein a preprocessor adds a node to a preprocessor content graph of said preprocessor each time a received message does not have a corresponding node in said preprocessor content graph.

7. The method of claim 1, wherein information about said node is obtained from preconstructed tables including graph information about a categorical hierarchy.

8. The method of claim 1, wherein said message is a notification message and said preprocessed message includes at least one identifier matching said notification message.

9. The method of claim 8, wherein said preprocessed message includes a set of one or more nodes in said content graph representing lowest nodes in said content graph that cover said notification message, said content graph being a hierarchy of nodes representing relationships between different sets of elements, wherein each node in said set matches said notification message and no node in said set is an ancestor of any other node in said set.

10. The method of claim 8, wherein said preprocessed message includes a set of one or more nodes in said content graph representing all nodes in said content graph that cover said notification message, said content graph being a hierarchy of nodes representing relationships between different sets of elements.

11. The method of claim 9, wherein said server includes a plurality of routers in a hierarchical arrangement, and the method further comprising:
receiving at a first router that is a root of said hierarchical arrangement said preprocessed message; and
forwarding said preprocessed message to any downstream neighbors of said first router at a lower level in said hierarchical arrangement than said root in accordance with a content graph of said first router.

12. The method of claim 11, wherein said neighbors of said first router include other routers and subscribers, said other routers being connected to said first router in accordance with a subscription list of said content graph of said first router.

13. The method of claim 11, further comprising:
modifying a header of a notification message forwarded in said forwarding in which said identifier is replaced with another identifier determined in accordance with a neighbor receiving said notification message.

14. The method of claim 13, wherein said other identifier is predetermined prior to receiving said preprocessed message by said root.

15. The method of claim 11, wherein said preprocessed message includes a sequence number uniquely corresponding to the notification message, said notification message being associated with a node in a categorical hierarchy wherein said node in said categorical hierarchy has a sequence number determined in accordance with a number of notification messages received by said server covering said node, each node in said categorical hierarchy having its own sequence number.

16. The method of claim 15, further comprising:
receiving by said first router a request from a subscriber for a table of current sequence numbers for a requested node and descendants of said requested node in said content graph of said first router; and
sending to said subscriber said table, wherein said subscriber uses said table to determine a missed notification message in accordance with consecutive sequence numbers for each node described by said table.

17. The method of claim 16, wherein, in response to receiving a notification message, said first router increments a sequence number of each of one or more nodes in said content graph corresponding to said notification message.

18. A computer program product stored in a memory for processing messages in a subscription system comprising code that:
preprocesses a message using a content graph to produce a preprocessed message including an identifier in accordance with said message; and
submits said preprocessed message to a server for processing wherein said server performs at least one action in accordance with said identifier included in said preprocessed message, wherein said message is a subscription message and said preprocessed message includes an identifier matching said subscription message, and
wherein said server includes a plurality of routers in a hierarchical arrangement, and the computer program product further comprising code that:
receives said preprocessed message at a router of the plurality of routers;
stores, at said router, information in a content graph of said router, the information including information about a subscription in accordance with said preprocessed message; and
forwards said preprocessed message to one or more upstream routers of the plurality of routers at a higher level in said hierarchical arrangement than said router in accordance with a forwarding table of said router.

19. The computer program product of claim 18, further comprising code that:
adds a node to said content graph of said router if there are no nodes in said content graph corresponding to said subscription.

20. The computer program product of claim 19, wherein said router communicates with another upstream router to obtain graph information about where to add said node to said content graph.

21. The computer program product of claim 19, wherein said router communicates with said preprocessor to obtain graph information about where to add said node to said content graph.

22. The computer program product of claim 18, wherein each router in said hierarchical arrangement includes a content graph of said each router including information about preprocessed subscription messages received from a subscriber and other routers connected to said each router in said hierarchical arrangement.

23. The computer program product of claim 18, wherein a preprocessor adds a node to a preprocessor content graph of said preprocessor each time a received message does not have a corresponding node in said preprocessor content graph.

24. The computer program product of claim 18, wherein information about said node is obtained from preconstructed tables including graph information about a categorical hierarchy.

25. The computer program product of claim 18, wherein said message is a notification message and said preprocessed message includes at least one identifier matching said notification message.

26. The computer program product of claim 25, wherein said preprocessed message includes a set of one or more nodes in said content graph representing lowest nodes in said content graph that cover said notification message, said content graph being a hierarchy of nodes representing relationships between different sets of elements, wherein each node in said set matches said notification message and no node in said set is an ancestor of any other node in said set.

27. The computer program product of claim 25, wherein said preprocessed message includes a set of one or more nodes in said content graph representing all nodes in said content graph that cover said notification message, said content graph being a hierarchy of nodes representing relationships between different sets of elements.

28. The computer program product of claim 26, wherein said server includes a plurality of routers in a hierarchical arrangement, and the computer program product further comprising code that:
   receives at a first router that is a root of said hierarchical arrangement said preprocessed message; and
   forwards said preprocessed message to any downstream neighbors of said first router at a lower level in said hierarchical arrangement than said root in accordance with a content graph of said first router.

29. The computer program product of claim 28, wherein said neighbors of said first router include other routers and subscribers, said other routers being connected to said first router in accordance with a subscription list of said content graph of said first router.

30. The computer program product of claim 28, further comprising code that:
   modifies a header of a notification message forwarded in said forwarding in which said identifier is replaced with another identifier determined in accordance with a neighbor receiving said notification message.

31. The computer program product of claim 30, wherein said other identifier is predetermined prior to said preprocessed message being received by said root.

32. The computer program product of claim 28, wherein said preprocessed message includes a sequence number uniquely corresponding to the notification message, said notification message being associated with a node in a categorical hierarchy wherein said node in said categorical hierarchy has a sequence number determined in accordance with a number of notification messages received by said server covering said node, each node in said categorical hierarchy having its own sequence number.

33. The computer program product of claim 32, further comprising code that:
   receives by said first router a request from a subscriber for a table of current sequence numbers for a requested node and descendants of said requested node in said content graph of said first router; and
   sends to said subscriber said table, wherein said subscriber uses said table to determine a missed notification message in accordance with consecutive sequence numbers for each node described by said table.

34. The computer program product of claim 33, wherein, in response to receiving a notification message, said first router increments a sequence number of each of one or more nodes in said content graph corresponding to said notification message.

* * * * *